(12) United States Patent
Ferranti et al.

(10) Patent No.: US 12,714,067 B2
(45) **Date of Patent: *Aug. 25, 2026**

(54) FEEDING SYSTEM AND METHOD FOR FEEDING ANIMALS

(71) Applicant: LELY PATENT N.V., Maassluis (NL)

(72) Inventors: Vincenzo Ferranti, Rotterdam (NL); Lois Hofland, Rotterdam (NL); Johannes Jacobs, Vlaardingen (NL); Jelle Wybe De Jong, The Hague (NL); Tom Adrianus Josephus Van De Ven, Udenhout (NL); Stefan Johannes Francisca Maria Verbruggen, Schiedam (NL)

(73) Assignee: LELY PATENT N.V., Maassluis (NL)

( * ) Notice: Subject to any disclaimer, the term of this patent is extended or adjusted under 35 U.S.C. 154(b) by 650 days.

This patent is subject to a terminal disclaimer.

(21) Appl. No.: 17/785,096

(22) PCT Filed: Dec. 15, 2020

(86) PCT No.: PCT/NL2020/050792

§ 371 (c)(1),
(2) Date: Jun. 14, 2022

(87) PCT Pub. No.: WO2021/125948

PCT Pub. Date: Jun. 24, 2021

(65) Prior Publication Data

US 2023/0028440 A1 Jan. 26, 2023

(30) Foreign Application Priority Data

Dec. 19, 2019 (NL) ..................................... 2024508
Nov. 30, 2020 (NL) ..................................... 2027010

(51) Int. Cl.
*A01K 5/02* (2006.01)
*G06Q 10/087* (2023.01)

(52) U.S. Cl.
CPC ......... *A01K 5/0275* (2013.01); *G06Q 10/087* (2013.01)

(58) Field of Classification Search
CPC ........................... A01K 5/0275; G06Q 10/087
See application file for complete search history.

(56) References Cited

U.S. PATENT DOCUMENTS 9,247,719 B1 * 2/2016 Bennett .................. A01K 39/04
2002/0174081 A1 * 11/2002 Charbonneau ......... G06Q 40/04 706/15

(Continued)

FOREIGN PATENT DOCUMENTS

EP 2 134 161 A1 12/2009
EP 3494779 A1 * 6/2019 ............... A01K 5/02

(Continued)

OTHER PUBLICATIONS

International Search Report issued May 4, 2021 in PCT/NL2020/050792, filed on Dec. 15, 2020, 4 pages.

*Primary Examiner* — Andrew Schechter
*Assistant Examiner* — Kaleria Knox
(74) *Attorney, Agent, or Firm* — Oblon, McClelland, Maier & Neustadt, L.L.P.

(57) ABSTRACT

A feeding system for feeding animals, in particular cows, at a feeding place that includes at least one autonomous feeding device with a container for accommodating a batch of feed from a feed supply. The autonomous feeding device takes feed held in the container to the feeding place and dispenses it at that feeding place. The feeding system includes a feed-quantity measuring device for measuring a feed-quantity value for the quantity of feed at the feeding place, and a control system receives feed-quantity values from the feed-quantity measuring device. The control system stores a plurality of feed-quantity values received from the feed-quantity measuring device in a memory. The con- (Continued)

trol system determines at least one value of a variable which is representative of a relation between the feed-quantity values and time, at least at and/or after the last measurement instant, based on the feed-quantity values stored in the memory.

20 Claims, 5 Drawing Sheets

(56) References Cited

U.S. PATENT DOCUMENTS

2010/0326363 A1* 12/2010 Van Den Berg .... B01F 35/7548 119/57.92
2015/0034014 A1* 2/2015 Van Kuilenburg ...... A01K 5/02 119/51.01
2015/0230427 A1* 8/2015 Wisse ...................... A01K 1/01 701/2
2021/0127630 A1* 5/2021 Zimmerman ......... A61B 5/1118

FOREIGN PATENT DOCUMENTS

KR 101808706 B1 * 12/2017 ........... A01K 5/0114
KR 20190012583 A * 2/2019 ........... A01K 5/0275
WO WO-2006097448 A1 * 9/2006 ............... A21B 1/48
WO WO-2008097080 A1 * 8/2008 ............. A01K 1/105
WO WO-2013112042 A1 * 8/2013 ............. A01K 1/105

* cited by examiner 1
2
350
300
250
200
150
100
50
h (mm)
12:00
00:00
12:00
00:00
12:00
00:00
t

FEEDING SYSTEM AND METHOD FOR FEEDING ANIMALS

The invention relates to a feeding system for feeding animals, in particular cows, such as dairy cows or meat cows.

EP 2134161 A1 discloses an automatic feeding system for animals. The feeding system comprises a mixing device, a control device, a plurality of feeding areas and a feed measurement arrangement. The animals are usually divided into groups, for example based on the lactation stage or milk yield, with each group having a different feed requirement. Each group of animals has access to one of the feeding areas. The control device controls the mixing device in order to prepare a batch of feed according to a selected recipe. The batch of mixed feed is accommodated in an automatic feeding device which takes the batch of mixed feed to the feeding areas, so that the animals are able to eat from it. The feed measurement arrangement repeatedly measures the quantity of mixed feed which is present at the feeding areas. The control device repeatedly compares the measured remaining quantity of mixed feed in the feeding areas with a threshold value. The threshold value can be set separately for each feeding area, for example by a farmer. If the measured remaining quantity of mixed feed in one of the feeding areas falls below the threshold value, the control device sends a command to the mixing device to prepare a subsequent batch of feed according to the selected recipe. The threshold value is chosen such that there is sufficient time to mix the subsequent batch of feed and deliver it to the feeding areas before the feed for the animals at the feeding areas finishes. In other words, the preparation of a subsequent batch of feed is started well before the remaining quantity of feed at one of the feeding areas is 0. Therefore, the animals are always able to eat. It is well-known that this is particularly desirable for the milk yield of dairy cows.

However, the operation of this feeding system is not optimal. The threshold values are set in such a way that there is always feed present in the feeding areas, but if the feed is left for a prolonged period of time, the quality of the feed diminishes. When choosing the threshold values, the farmer has to find a compromise between on the one hand ensuring that the animals can always eat and on the other hand maintaining the quality of the feed, in particular the freshness. It is difficult to choose such threshold values accurately. In order to ensure that the animals will always be able to eat, the farmer will, in practice, choose a threshold value which is higher, rather than lower. This means that a subsequent batch of feed is virtually always delivered to the feeding area unnecessarily early. Consequently, the feed is less fresh, as a result of which the feed intake of the animals is not optimal.

It is an object of the invention to provide an improved feeding system, wherein in particular the feed intake by the animals is increased.

According to the invention, this object is achieved by a feeding system for feeding animals, in particular cows, such as dairy cows or meat cows, at at least one feeding place feed from a feed supply, i.e. the feeding system may comprise a feed supply containing feed for the animals, and one or more feeding places for feeding the animals feed from the feed supply, at least when the feeding system is in operation and/or installed on a farm, and wherein the feeding system comprises:

- at least one autonomous feeding device comprising a container for accommodating a batch of feed from the feed supply, wherein the autonomous feeding device is configured to take feed held in the container to one or more of the feeding places and dispense it at those one or more feeding places,
- a feed-quantity measuring device for repeatedly measuring a feed-quantity value for the quantity of feed which is available and/or present for consumption by the animals at the or each feeding place, and
- a control system which is configured to receive feed-quantity values from the feed-quantity measuring device measured at the or each feeding place at different measurement instants, wherein the control system is configured to store a plurality of feed-quantity values received from the feed-quantity measuring device in a memory, and the control system is furthermore configured to determine, in particular calculate, on the basis of a plurality of feed-quantity values stored in the memory, at least one value of a variable which is representative of a relation between the feed-quantity values and time, i.e. relates to the course of or the decrease in the feed-quantity values over time, at least for a period at and/or after the last measurement instant.

With the above-mentioned known feeding system, each measured quantity of feed is compared to a threshold value and discarded or deleted after this comparison. In each case, only one measured quantity of feed is compared to the threshold value. If the measured quantity of feed is greater than the threshold value, no action is taken, and if the measured quantity of feed is smaller than the threshold value, the control device controls the mixing device so as to mix a subsequent batch of feed. In contrast to this known feeding system, the measured values for the quantity of feed according to the invention are not discarded or deleted, but stored in a memory of the control system, such as a memory on a computer at the farm, on a server at the manufacturer of the feeding system, in a cloud storage or in yet another manner.

The plurality of feed-quantity values which have been measured at different measurement instants contain information about variations in the rate of consumption, i.e. the rate with which the quantity of feed at the or each feeding place decreases. According to the invention, storing a plurality of feed-quantity values measured at the or each feeding place at different points in time makes it possible to deduce the course of the feed-quantity values over time and also to predict said course after the last measurement instant. The relation between the feed-quantity values and time depends on variations in the feed consumption, i.e. the rate of consumption of the animals. If the control system calculates, on the basis of the feed-quantity values for the or each feeding place stored in the memory, one or more values of a variable which represents the course of the feed-quantity values over time at least for a period after the last measurement instant, i.e. after the time of the feed-quantity value measured last and stored in the memory, such as the rate of consumption at and after the last measurement instant, or the feed quantity at one or more points in time after the last measurement instant, or yet another variable, this calculation therefore takes into account any variations in the rate of consumption. Herein, the "variable" is also referred to by the term "feed variable", which indicates that the variable relates to the feeding of animals. The value(s) of the variable depend on the changes of the feed-quantity value over time.

Incidentally, the period at and/or after the last measurement instant, for which the control system calculates one or more values of the variable which characterizes the relation between the feed-quantity values and time, may comprise points in time in the past, the current instant ("real time") and/or future instants. If, for example, the last feed-quantity value was measured an hour ago, the control system may calculate a value for the variable which predicts the relation between the feed-quantity values and time from that last measurement instant an hour ago or from the current instant and up to one or more future instants. Calculating one or more values of the variable to predict the relation between the feed-quantity values and time at and/or after the last measurement instant yields particular advantages.

The control system can use the calculated value(s) of the variable in various ways to control the feeding system more reliably and accurately. In particular, the control system may be configured to control the feeding system based on the calculated value(s) of the feed variable to determine when a subsequent batch of feed should be taken to the feeding place by the autonomous feeding device. According to the invention, calculating the value(s) of the variable which is representative of the relation between the feed-quantity values and time at least for a period at and/or after the last measurement instant, makes it possible, for example, to accurately predict when the feed at the or each feeding place will finish or how much time remains until this is the case. Based on the calculated value(s) of the variable, the control system according to the invention can control the feeding system in such a way that it loads a subsequent batch of feed into the autonomous feeding device and/or causes the autonomous feeding device to take it to the feeding place. In this case, for example, the time it takes to prepare this subsequent batch of feed and to take it to the feeding places and dispense it by means of the autonomous feeding device is taken into account. The feeding system according to the invention can therefore not only ensure that there is always feed present at the feeding places, but it also makes it possible to deliver the subsequent batch of feed at the feeding places at a more accurate time ("on-time feeding"). Because there is less residual feed, the quality of the feed at the feeding places is preserved more efficiently, so that the feed intake by the animals is increased and feed losses are reduced.

In other words, the feeding system known from EP 2134161 A1 works in a reactive manner. If the measured remaining quantity of mixed feed has only just dropped below the threshold value, the threshold value having been set relatively high to be on the safe side and in order to ensure that there is always feed present, a subsequent batch of feed will often be delivered to the feeding areas prematurely. If the measured remaining quantity of mixed feed has not quite dropped below the threshold value, the trigger to add feed will only be given at the next measurement and by that time, too little feed may remain, so that the subsequent batch of feed is delivered too late. By contrast, the feeding system according to the invention is pro-active. When adding feed, the course of the feed-quantity values over time is taken into account, so that the subsequent batch of feed can be delivered to the feeding places at a more accurate time.

Incidentally, the feeding places according to the invention may be configured in different ways. It is preferable that the or each feeding place comprises a feed fence for feeding the animals, such as in an animal shed, wherein the autonomous feeding device is configured to autonomously displace a batch of feed held in the container from the feed supply to the feed fence and to autonomously dispense and/or dose out that feed along the feed fence.

In a preferred embodiment according to the invention, the control system is configured to generate or emit a, in particular time-dependent, feed-finished signal based on the at least one value of the variable determined by the control system which is representative of the relation between the feed-quantity values and time at least for a period at and/or after the last measurement instant. In particular, the feed-finished signal is related to a future depletion time $t_2$ for one or more of the feeding places. The feed-finished signal is representative of when the feed at the or each feeding place finishes (instant) or how much time remains until this is the case (period of time). The feed-finished signal may comprise the future depletion time $t_2$ as such or the period of time until that depletion time. The depletion time at which the feed finishes or how much time remains until this is the case is therefore derived from the predicted relation between the feed-quantity values and time. When the control system according to the invention has generated the feed-finished signal, it has been determined thereby when the feed at the or each feeding place finishes. The control system may furthermore be configured to determine, based on the feed-finished signal, a starting time to start loading of a subsequent batch of feed or to start taking a batch of feed which has already been loaded to the feeding place.

Incidentally, instead of first generating a feed-finished signal and deriving the starting time on the basis thereof, it is also possible, according to the invention, for the control system to be configured to determine the starting time and/or to generate or send a start command based directly on the calculated variable which characterizes the predicted course of the feed-quantity values over time. Therefore, emitting the feed-finished signal, i.e. calculating—as an intermediate step—when the feed at the or each feeding place will finish or how much time remains until this is the case, is advantageous, but not necessary.

According to the invention, the term "finishing" of the feed at the one or more feeding places is understood to mean that the animals do not or hardly eat the feed at these feeding places—in practice there will usually be a residual quantity of feed which is left, which the animals have sorted out while eating. In a preferred embodiment, the future depletion time corresponds to the point in time at which the feed-quantity value, according to the predicted relation between the feed-quantity values and time which is characterized by the value of the variable calculated by the control system, becomes equal to or drops below a preferably preset, effective or actual empty value which corresponds to a residual quantity of feed at those one or more feeding places. In other words, the future depletion time is formed by the point in time at which the feed-quantity value of the feeding place drops below the effective empty value of this feeding place.

The control system may be configured to determine the future depletion time, or the period of time until that depletion time occurs, by analyzing when the feed-quantity value based on the value of the variable determined by the control system which predicts the course of the feed-quantity value over time, becomes equal to or drops below the effective empty value of this feeding place. When the control system has predicted the relation between the feed-quantity values and time for a period after the last measurement instant, the control system is able to determine when the feed-quantity value drops below this effective empty value. The effective empty value corresponds to a residual quantity of feed which is substantially no longer suitable for consumption by the animals or will, in practice, no longer be eaten by the animals. In other words, when the effective empty value is reached, the feed is "finished", even though there is still a small residual quantity of feed present. The point in time at which the feed at the or each feeding place "finishes" in this sense, is the depletion time. The control system is able to predict the depletion time accurately and reliably for the future and, on the basis thereof, determine the correct moment to load a subsequent batch of feed into the autonomous feeding device and/or to have it taken to the feeding place by the autonomous feeding device in such a way that that this subsequent batch of feed is delivered to the feeding places at an accurate time.

It should be noted that the effective empty value according to the invention differs from the above-mentioned threshold value known from EP 2134161 A1. As has already been explained, this known feeding system compares each measured quantity of feed to a threshold value, and if the measured quantity of feed falls below this threshold value, then this is a trigger for mixing the subsequent batch of feed. This threshold value is always chosen to be greater than zero in such a way that there is sufficient time to mix the next batch and deliver it to the animals. However, the effective empty value according to the invention forms a "zero value", i.e. corresponds to an "empty" feeding place. The measured feed-quantity values are not compared to the effective empty value, and obviously this zero value also does not constitute a trigger to prepare a subsequent batch of feed—after all, the feed is already finished when this effective empty value is reached. The effective empty value according to the invention is only used to determine when the feed actually "finishes", i.e. the depletion time.

In an alternative embodiment, the control system is configured to determine the future depletion time, or the period of time until that depletion time occurs, by analyzing when the rate at which the feed-quantity value decreases, in particular the rate of consumption, based on the value of the variable determined by the control system which predicts the course of the feed-quantity value over time, becomes equal to or drops below a threshold value for the rate of consumption at this feeding place. If the predicted feed-quantity value no longer decreases, or hardly, i.e. the residual quantity of feed is not eaten anymore, the feeding place is effectively empty. The point in time at which the predicted rate of consumption at a feeding place drops below the threshold value for the rate of consumption, and the feed at this feeding place "finishes" in this sense, then forms the depletion time. The control system may then again on the basis thereof determine the correct moment to deliver a subsequent batch of feed.

In a preferred embodiment according to the invention, the control system is configured to control the feeding system, in particular at least the autonomous feeding device and/or a feed-loading system for loading feed from the feed supply into the container of the autonomous feeding device, based on the feed-finished signal, in particular based on the future depletion time $t_2$, or the time period until that depletion time $t_2$, in such a way that a subsequent batch of feed is dispensed at one or more of the feeding places by the autonomous feeding device before the animals have substantially eaten the feed at these one or more feeding places. Based on the feed-finished signal, the control system can calculate a starting time $t_1$ to determine when a start has to be made with loading a subsequent batch of feed into the autonomous feeding device and/or taking it to the feeding place by the autonomous feeding device, in such a way that this subsequent batch of feed is delivered at the feeding places accurately on time. Thus, it is substantially ensured that the animals can always eat, while the feed quality remains optimal.

In an embodiment according to the invention, the variable is representative of the rate of consumption at and/or after the last measurement instant with which the quantity of feed which is available and/or present for consumption by the animals at the or each feeding place, decreases at this feeding place. The control system is in particular configured to determine the variable which is representative of the rate of consumption at the one or more feeding places in each case for the last measurement instant. After each measured feed-quantity value, the value of the variable is then updated or refreshed, i.e. the control system dynamically adjusts the variable by means of, in each case, the last-measured feed-quantity value. The control system may be configured to determine at least one value of a variable which represents the rate of consumption at the or each feeding place at least at and/or after the last measurement instant, based on the feed-quantity values stored in the memory, for example up to the current instant, i.e. the rate of consumption at the or each feeding place in "real-time", or in the future, such as 2 hours or 6 hours or 12 hours in advance. The rate of consumption at the or each feeding place is understood to mean the rate at which the quantity of feed which is available for consumption by the animals decreases at this feeding place. Once the rate of consumption has been determined, the control system can, on the basis thereof, for example, adjust the feeding system so that it delivers a subsequent batch of feed at the or each feeding place at a desired point in time. Thus, the timing for adding feed can be made more accurate. This results in a significantly improved feed intake and reduced feed loss.

In an embodiment according to the invention, determining the one or more values of the variable which represents the relation between the feed-quantity values and time, comprises determining, for each last-measured feed-quantity value stored in the memory, in each case an associated function h(t) for the feed-quantity values h as a function of the time t by means of a function fit, in particular "curve fit", based on a plurality of feed-quantity values stored in the memory. In this case, the control system is configured to predict the relation between the feed-quantity values and the time by means of a function fit. The control system is preferably configured to determine the function h(t) repeatedly or continuously, i.e. the control system dynamically adjusts the function h(t). The function h(t) may, for example, be updated or refreshed after each measured feed-quantity value. As a result, the prediction model is self-learning or machine-learning. In addition, the control system is adaptive, i.e. that the measured feed-quantity values are used while the data are being collected and the prediction model learns to determine the function h(t) more accurately ("online learning"). A function h(t) is in each case added to each measured feed-quantity value and associated measurement instant, which the control system has determined, based on this measured feed-quantity value and previous measured feed-quantity values. When a new feed-quantity value is measured, the control system again determines a new function h(t), which may vary slightly from the previous function h(t). As a result, the control system adjusts the planning of the feeding operations depending on the last available information, as a result of which feed may be added at a very accurate time. It has been found that the prediction is sufficiently accurate, while the required computing power remains limited and the feeding system automatically adjusts to changing circumstances.

According to the invention, the control system may be configured to determine different function relations. In a preferred embodiment, the function h(t) for the feed-quantity values h as a function of the time t comprises an exponential function, in particular $e^{\lambda t}$, or an exponential function with a different base than the number e, in which the parameter λ, which is smaller than 0, is the variable, which is representative of the relation between the feed-quantity values and time, at least at and/or after the last measurement instant, in particular characterizes the rate of consumption, and t is the time, and wherein the control system is configured to calculate a value for the parameter λ in the exponential function by means of the function fit, in particular "curve fit", based on a plurality of feed-quantity values stored in the memory. In this case, it is assumed that the feed-quantity values have an exponential course over time. As a result thereof, deviating measurements are forced into that exponential course, as it were. Surprisingly, it was found that the predictions of the relation between the feed-quantity values and time during a period at and/or after the last measurement instant are very accurate as a result thereof.

In this case, it is furthermore preferable, according to the invention, for the control system to be configured to calculate a value for the time tin the function h(t) by solving an equation which equates the function h(t) for the feed-quantity values as a function of the time t to an effective empty value for a residual quantity of feed $h_{res}$, wherein the calculated value for the time t is representative of a future depletion time $t_2$ for the feeding place. The control system is preferably configured to solve this equation for each of the feeding places. The control system may furthermore be configured to generate the feed-finished signal based on this calculated value for the time for each of the feeding places. In other words, by solving the equation $h(t)=h_{res}$ the control system determines when the feed at one or more of the feeding places effectively finishes, or how much time remains until this is the case. On the basis thereof, the control system can then ensure that a subsequent batch of feed is delivered at the feeding places at an accurate time, i.e. not too early, so that the feed remains fresh, and not too late, so that the animals are always able to eat.

According to the invention, it is also possible for the control system to be configured to determine the one or more value(s) of the variable which is representative of the relation between the feed-quantity values and the time t at least at and/or after the last measurement instant, based on a time-dependent selection of the feed-quantity values stored in the memory. According to the invention, the control system can use a group of n last, measured feed-quantity values stored in the memory. This plurality of n feed-quantity values can therefore be formed by the last-measured feed-quantity value and the feed-quantity values immediately preceding it. In this case, the most recent measurements are used. The number of n feed-quantity values may be dynamic. If there are a plurality of feeding places, it is for example possible for the control system to be configured to monitor when feed has been dispensed at each feeding place, and the variable which is representative of the relation between the feed-quantity values and the time t at least at and/or after the last measurement instant, is determined separately for each feeding place based on the feed-quantity value which was measured when the feed was dispensed at that feeding place and the feed-quantity values which were subsequently measured at that feeding place, in particular if the autonomous feeding device travels past this feeding place when dispensing feed at one or more of the other feeding places. In other words, the value n then increases after each measured feed-quantity. The number of n feed-quantity values is, for example, between 5 and 500. If, for example, the last 30 measured feed-quantity values are in each case analyzed (n=30) and the feed-quantity values are measured approximately 10 times a day, then the control system determines the function h(t) based on approximately 3 days, i.e. in practice virtually always a period of time in which a plurality of successive batches of feed have been dosed out by the autonomous feeding device. The measured feed-quantity values of different feeding rounds are then combined. It has been found that for small groups of feed-quantity values, such as n=30, the prediction is sufficiently accurate, while the required computing power remains limited and the feeding system automatically adjusts to changing circumstances. If n is smaller, for example n=5, the control system determines the function h(t) based on one or two feeding rounds and the function h(t) for the feed-quantity values as a function of the time t adjusts more quickly. As a result thereof, the feeding system can take the day and night rhythm of the animals into account.

It is also possible to take the day and night rhythm of the animals into account in other ways. In a particular embodiment according to the invention, the control system is configured to determine the time-dependent selection of the feed-quantity values stored in the memory, depending on the time of day. Based on the time of day, the control system is then able to set a time window, and the control system determines the variable which is representative of the relation between the feed-quantity values and the time t, based only on feed-quantity values which have been measured on one or more days during this time window. If the time is, for example, 10:00 h in the morning, the control system may set a time window from 10:00 h to 12:00 h The feed-quantity values which were measured on previous days between 10:00 h and 12:00 h are then used for the prediction. Later during the day, for example at 14:00 h in the afternoon, the control system shifts the time window from 14:00 h to 16:00 h, etc. In this case, the control system is configured to set a dynamic time window. However, it is also possible to select one or more fixed time windows. From the plurality of n feed-quantity values measured during a consecutive period, the control system then selects those feed-quantity values which were measured during the set time windows, such as from 6:00 h to 12:00 h or from 00:00 h to 6:00 h, i.e. during the morning or the night. The selection is then chosen in particular to take the day and night rhythm of the animals into account.

In a preferred embodiment according to the invention, the feeding system comprises a feed-loading system for loading feed from the feed supply into the container of the autonomous feeding device. According to the invention, the feed-loading system may be configured in different ways.

It is possible, for example, for the container of the autonomous feeding device to comprise a mixing device for mixing the feed held in the container. The feed-loading system can load feed from the feed supply, in particular different types of feed, into the container of the autonomous feeding device, after which the mixing device of the autonomous feeding device mixes the feed held in the container to produce a mixed batch of feed. The autonomous feeding device then takes the mixed batch of feed to the one or more feeding places. In this case, the autonomous feeding device forms a mixing and feeding device. Incidentally, the feed in the container of the autonomous feeding device may already be prepared, i.e. the batch of feed may be loaded beforehand, before the autonomous feeding device starts taking the feed to the one or more feeding places.

However, according to the invention, it is also possible for the feed-loading system to comprise a stationary mixing device for mixing feed. The stationary mixing device is for example configured to accommodate a quantity of feed which corresponds to a single batch of feed in the container of the autonomous feeding device. In this case, the feed-loading system is configured to load feed from the feed supply into the stationary mixing device, and to load the mixed feed from the stationary mixing device into the container of the autonomous feeding device in order to form a mixed batch of feed therein. Subsequently, the autonomous feeding device transports the mixed batch of feed to the feeding places. In this case, the feeding device is not also the mixing device—the feeding device is only configured to dose out the feed. In this case as well, the batch of feed may already have been made available premixed in the stationary mixing device before the mixed feed is loaded into the container of the autonomous feeding device.

Furthermore, the stationary mixing device may be configured to accommodate a quantity of feed which corresponds to a plurality of batches of feed in the container of the autonomous mixing device. For example, the feed in the stationary mixing device is premixed in order to form a stock quantity of mixed feed therein, a portion of which can then be loaded into the container of the autonomous feeding device in order to form the mixed batch of feed for dosing out at the one or more feeding places. In other words, the stock quantity of mixed feed is prepared beforehand in the stationary mixing device in order to load a batch of feed into the container of the autonomous feeding device therefrom.

Irrespective of the embodiment of the feed-loading system, it is preferable for the control system to be configured to control, on the basis of the one or more determined, in particular calculated, values of the variable, and/or on the basis of the feed-finished signal which is generated on the basis of this (these) value(s), the feed-loading system and/or the autonomous feeding device to load a subsequent batch of feed into the container of the autonomous feeding device and/or to take a subsequent batch of feed which has been loaded in the container of the autonomous feeding device to the feeding place. In particular, the control system is configured to control, on the basis of the one or more determined, in particular calculated, values of the variable, and/or on the basis of the feed-finished signal which is generated on the basis of this (these) value(s), the feed-loading system and/or the autonomous feeding device to start loading a subsequent batch of feed into the container of the autonomous feeding device or to take a subsequent batch of feed which has already been loaded in the container of the autonomous feeding device to the feeding place.

In this case, it is possible for the control system to be configured to determine a starting time to start loading a subsequent batch of feed and/or to take a loaded subsequent batch of feed to the feeding place on the basis of the one or more determined or calculated values of the variable, and/or on the basis of the feed-finished signal which is generated on the basis of this (these) value(s). The control system may be configured to determine the starting time $t_1$ on the basis of the future depletion time $t_2$, or the period of time until that depletion time $t_2$ occurs. Furthermore, the control system may be configured to send a start command to the feed-loading system at the starting time to start loading the subsequent batch of feed or to the autonomous feeding device to start taking an already loaded batch of feed to the feeding place.

In an embodiment in which the feed is mixed in the container of the autonomous feeding device, loading a subsequent batch of feed into the container of the autonomous feeding device is started by sending a start command to the feed-loading system to transfer feed from the feed supply to the container of the autonomous feeding device. If a batch of feed has already been loaded into the container of the autonomous feeding device, it is possible to start taking this batch of feed to the feeding places immediately—the autonomous feeding device then receives a corresponding start command.

With a feed-loading system comprising a stationary mixing device which in each case mixes only one batch of feed, starting to load a subsequent batch of feed into the container of the autonomous feeding device may be understood to mean that the feed-loading system receives a start command to load feed from the feed supply into the stationary mixing device in order to form the mixed batch of feed therein, following which the mixed batch of feed from the stationary mixing device is loaded into the container of the autonomous feeding device. The feed is loaded into the container of the autonomous feeding device via the stationary mixing device.

If a relatively large stock quantity of mixed feed has been prepared in the stationary mixing device, then starting to load a subsequent batch of feed into the container of the autonomous feeding device means that the feed-loading system receives a start command to load feed from this stationary mixing device into the container of the autonomous feeding device in order to form a mixed batch of feed therein.

According to the invention, it is preferable with the above-described and other possible embodiments of the feed-loading system for the control system to control the loading of a subsequent batch of feed and/or the taking of an optionally already loaded batch of feed to the one or more feeding places on the basis of the calculated value(s) of the variable, and/or on the basis of the feed-finished signal that is generated on the basis of this (these) value(s). As a result thereof, the control system can accurately set a desired moment at which feed from this subsequent batch of feed is dosed out at the or each feeding place, i.e. the feeding system according to the invention is able to add feed to the feeding places at the desired time much more precisely. For example, the control is such that the animals always have fresh feed of high quality available to them.

The starting time $t_1$ for starting to load a subsequent batch of feed and/or to take a loaded subsequent batch of feed to the feeding place, i.e. the point in time at which the control system sends a start command to the feed-loading system to start loading the subsequent batch of feed or to the autonomous feeding device to start taking an already loaded batch of feed to the feeding place can be based, according to the invention, on the feed-finished signal, in particular the future depletion time $t_2$, or the period of time until that depletion time $t_2$ occurs. According to the invention, this may take place in different ways.

In particular, the control system is configured to determine the starting time by calculating back at least by a time interval x from that future depletion time $t_2$ for the or each feeding place. If the control system has determined the depletion time $t_2$, the control system determines the point in time which precedes the depletion time $t_2$ by at least the time interval x as the starting time $t_1$ to start loading the subsequent batch of feed and/or to take a loaded subsequent batch of feed to one or more of the feeding places. As a result thereof, it is ensured that there is always feed present for the animals, while adding feed can be planned as late as possible. This results in a high feed intake, reduced loss of feed and maintains the quality of the feed for a longer period of time.

The time interval x for the or each feeding place is selected in the control system, for example, as a fixed period. In this case, the fixed time interval can be input manually into the control system by a farmer or service technician, or may be calculated by the control system and set automatically. The fixed time interval is, for example, between 10 minutes and 3 hours. Such a time interval is usually sufficient in practice to prepare a subsequent batch of feed, to load it and take it to the feeding places and dispense it.

The time interval x is preferably dynamic. In a particular embodiment according to the invention, the control system is configured to determine the time interval x based on a required loading time to load the subsequent batch of feed. The required loading time depends, for example, on the selected ration which is used for the subsequent batch of feed, the quantity (in kg) of the subsequent batch of feed, and the associated mixing time. It is possible for different rations to be stored in the memory of the control system. The control system may select a ration from the rations stored in the memory, after which the subsequent batch of feed is loaded in accordance with that selected ration. A ration comprises different types of feed in a predetermined ratio (kg). In general, the feeding system according to the invention is adapted to be able to compose a batch of feed in accordance with different rations, as the feed requirements of the animals vary with time. For example, the feed requirement of dairy cows depends on the lactation stage. Furthermore, the dairy cows are in practice usually divided into groups, based on the lactation stage or milk yield, with each group having a different feed requirement. The farmer can select one of the rations manually, or the control system is configured to automatically select a ration on the basis of a feed requirement at one or more of the feeding places. In particular, the control system determines the feed requirement for a specific ration in dependence on the feeding place where the feed-quantity values were measured. However, preparing one ration may take more time than preparing another ration. This also depends on the quantity of feed which is required for the subsequent batch and the associated mixing time. In order to further refine the timing of adding feed, the control system may take the loading time required to prepare a subsequent batch of feed into account.

In addition, the time which the autonomous feeding device takes to reach the various feeding places may differ. One feeding place may be closer to the feed supply than another feeding place. In order to make the timing for delivering the feed more accurate, it is possible, according to the invention, for the control system to be configured to determine a delivery or travel time for taking the feed held in the container to the one or more feeding places by means of the autonomous feeding device, wherein the control system is furthermore configured to determine the time interval x for the or each feeding place based on this delivery or travel time.

In a particular preferred embodiment according to the invention, the feed-quantity measuring device is fitted to the autonomous feeding device, wherein the feed-quantity measuring device is configured to measure the feed-quantity value at the or each feeding place when the autonomous feeding device moves past this feeding place. Preferably, the autonomous feeding device furthermore comprises a feed-pushing device for pushing feed in a direction at right angles to the direction of movement or travel of the autonomous feeding device. For example, the feed-pushing device is configured to push feed which was situated along a feed fence and was pushed away from the feed fence by the animals while eating, back to the feed fence.

According to the invention, it is furthermore possible for the container of the autonomous feeding device to comprise a dispensing device for dispensing feed from the container, wherein the feed-quantity measuring device is fitted to the autonomous feeding device in such a way with respect to the dispensing device that, when measuring the feed-quantity value, the quantity of feed which was just dispensed by the dispensing device is included. In other words, the quantity of feed which is dosed out by the autonomous feeding device is immediately included when measuring the quantity of feed which is present at the or each feeding place for consumption by the animals. In this case, the feed-pushing device may be configured to push feed which was dispensed by the autonomous feeding device. In other words, when the feed is discharged from the container of the autonomous feeding device, this feed is immediately formed into piles by pushing. Then, the feed-quantity measuring device measures the pushed feed, which comprises both feed which was already present at the feeding place and freshly dosed-out feed.

With the feeding system known from EP 2134161 A1, the feed-measuring system comprises a plurality of measuring units—each feeding area has its own measuring unit. These measuring units have to be connected to the control device in order to transmit the measured remaining quantities of mixed feed at the feeding areas. A wired connection is cumbersome and complicated, whereas a wireless connection in an animal shed virtually always suffers from connectivity problems. Although not described in the above-mentioned patent publication, it would be possible to use only a single measuring unit by attaching it to the automatic feeding device. This is known, for example, from the automatic feeding system Vector® by Lely. While the automatic feeding device then travels past the feeding areas, this measuring unit measures the remaining quantities of feed. In order to guarantee that a new batch of feed is delivered to the feeding area in time, using the method known from EP 2134161 A1, regular checks would have to be performed to ascertain that sufficient feed is still available at the feeding areas. The automatic feeding device would have to travel past the feeding areas relatively often in order in each case to measure the remaining quantity of feed at every feeding area and compare it to the threshold value. This means that the automatic feeding device would often travel with an empty container only for the purpose of measuring, and without delivering feed to the feeding areas ("scanning run"). As a result, the capacity of the feeding system would decrease, the automatic feeding device would be less efficient, have a relatively high power consumption and the service life of parts, such as batteries, would be adversely affected.

Due to the fact that the feeding system according to the invention, in contrast to the method known from EP 2134161 A1, calculates one or more values of a variable which is representative of the decrease in the feed-quantity values over time, at least for a period at and/or after the last measurement instant, and on the basis thereof determines when the subsequent batch should be loaded and/or delivered to the feeding places, the autonomous feeding device according to the invention has to drive around less often. Although the rate of consumption at a feeding place may, in exceptional cases, be so low, that it is desirable to measure additional feed-quantity values in the interim, i.e. in addition to driving the autonomous feeding device to dispense feed and/or pile it up, this is usually not necessary. The autonomous feeding device according to the invention virtually only travels to the feeding places to actually deliver feed or to pile it up. Each time the autonomous feeding device delivers feed at one or more of the feeding places or piles up the feed, the feed-quantity values at these feeding places are measured. The feed-quantity values measured at those instants are sufficient for the control system according to the invention to determine when it is optimal to prepare and/or deliver a subsequent batch of feed. As a result thereof, the capacity of the feeding system according to the invention is increased, and the autonomous feeding device with the incorporated feed-quantity measuring device according to the invention can operate in a particularly effective and energy-efficient manner.

Instead of or in addition to calculating a variable which is representative of the rate of consumption at and/or after the last measurement instant, the control system may be configured to calculate, based on the feed-quantity values stored in the memory, one or more values for at least one other variable at the or each feeding place which characterizes the course of the feed-quantity values over time, for a period at and/or after the last measurement instant. For example, the variable is representative of the quantity of feed which is available and/or present for consumption by the animals at the or each feeding place. In this case, the control system may be configured to determine, in particular calculate, based on a plurality of feed-quantity values stored in the memory, one or more feed-quantity values for the quantity of feed which is available and/or present for consumption by the animals at the or each feeding place, at one or more points in time after the last measurement instant. By predicting feed-quantity values after the last measurement instant, it is also possible to accurately estimate when the feed at one or more of the feeding places finishes. On the basis thereof, the control system is also able to determine the optimum starting time for starting to load a subsequent batch of feed into the autonomous feeding device and/or to automatically take a subsequent batch of feed, so that fresh feed is delivered at an accurate time.

Instead of or in addition to the above-described function fit process for calculating the value of the parameter $\lambda$, which forms the variable which is representative of the rate of consumption at and/or after the last measurement instant, the control system may be configured to predict this variable in a different way, or to determine other variables in other ways. In other words, the predictive process according to the invention may be configured in different ways. In a particular embodiment according to the invention, the control system is programmed with a different self-learning or machine-learning algorithm which is configured to receive a plurality of feed-quantity values stored in the memory, wherein the control system is configured to calculate the one or more values of the variable, for example a variable which is representative of the rate of consumption at and/or after the last measurement instant or feed-quantity values for the quantity of feed which is available and/or present for consumption by the animals at the or each feeding place at the one or more points in time after the last measurement instant, using the self-learning or machine-learning algorithm.

For example, the self-learning algorithm is configured to receive examples, preferably for each feeding place separately, which each comprise a value which is representative of one of the measurement instants, a feed-quantity value at that measurement instant and an associated value for the rate of consumption. The examples may comprise further time-dependent parameters, such as the time elapsed since the last feed delivery at the feeding place and/or the quantity of feed (kg) which was dispensed at the feeding place during an elapsed period of a preset duration, for example the past 5 hours or 10 hours. The self-learning algorithm is trained by means of such examples, which, for example, have been collected as historical data for a period of one or two months or longer. Examples of different feed fences and even different farms may be combined during a relatively long period in order to train such an algorithm. The more examples are available for the algorithm, the better the algorithm is able to learn.

The algorithm may be fed, for example, a first example of a feed-quantity value measured at a first measurement instant, a value which is representative of that measurement instant, and any further time-dependent parameters as input, and an associated value for the rate of consumption at that first instant as output, a second example of a feed-quantity value measured at a second instant, a value which is representative of that measurement instant, and again any further time-dependent parameters as input, and a feed-quantity value measured at that second instant as output, etc.

The algorithm is configured to recognize correlations, i.e. statistical relations, between the feed-quantity values measured at different measurement instants and stored in the memory depending on one or more associated time-dependent parameters at the or each feeding place as input and the values for the rate of consumption as output. The algorithm uses pattern recognition. Based on the correlations recognized, the algorithm can then determine a value for the rate of consumption at the feeding place at and/or after the last measurement instant as output, in particular predict it for the future, if a measured feed-quantity value stored in the memory having the value which is representative of that last measurement instant and, optionally, the further time-dependent parameters as input is presented to the algorithm. Preferably, the control system uses the last-measured feed-quantity value at the or each feeding place stored in the memory. The last-measured feed-quantity value is an important parameter for an accurate prediction.

After the self-learning algorithm has been trained sufficiently, the correlations are in principle fixed ("offline learning"). If the self-learning algorithm becomes less accurate over the course of time, the algorithm may be trained again using new examples. The sufficiently trained self-learning algorithm may determine the value for the rate of consumption at the or each feeding place at and/or after the last measurement instant, based on pattern recognition in the examples received. Subsequently, the control system may calculate, for example, the feed-quantity value or values at one or more points in time after the last measurement instant on the basis of that value for the rate of consumption. By using the algorithm, variations in the feed consumption by the animals, such as the day and night rhythm, are intrinsically taken into account, so that the feeding system can deliver the subsequent batch of feed to the feeding place (virtually) exactly on time ("on-time feeding"). This is advantageous for the feed intake of the animals and reduces feed losses.

In a particular embodiment according to the invention, the control system is configured to divide the feed-quantity values stored in the memory into groups over time, which each start with a feed-quantity value which is measured immediately after the delivery of feed and end with a feed-quantity value which is measured immediately before the delivery of feed. In this case, it is possible for the control system to be configured to calculate, for each of these groups of feed-quantity values $h_{-n}$, in particular by a function fit, such as a "curve fit", a value for a parameter $\lambda$ in a function h(t) for the feed-quantity values h as a function of the time t which comprises an exponential function, in particular $e^{\lambda t}$, or an exponential function with a different base than the number e, and wherein the parameter λ is in each case representative of the rate of consumption for that group of feed-quantity values $h_{-n}$, i.e. not after the last measurement instant, but just before, and t is the time. In this case, the self-learning algorithm can first be trained with examples which each comprise a feed-quantity value at a measurement instant, and optionally further time-dependent parameters, as input and a calculated value for the parameter λ associated with that instant as output. The self-learning algorithm may then furthermore be configured to determine, in particular predict, as output, a value for the parameter λ in the function h(t), i.e. using the above-mentioned exponential function with $e^{\lambda t}$, based on the last-measured feed-quantity value stored in the memory, and optionally further time-dependent parameters, as input. In other words, if the last-measured feed-quantity value stored in the memory, and optionally further time-dependent parameters, are input, the trained, self-learning algorithm determines with the parameter λ as output the course of the feed-quantity values over time after the last measurement instant.

Subsequently, the control system may, for example, be configured to calculate the feed-quantity value or values at one or more points in time after the last measurement instant, following which the control system determines when the predicted feed-quantity value drops below the effective empty value which corresponds to the residual quantity of feed. It is then also possible to determine when the feed will finish after the last measurement instant, i.e. the future depletion time $t_2$, or how much time remains until this is the case.

Instead of calculating feed-quantity values at one or more points in time after the last measurement instant by first predicting a rate of consumption, it is also possible, according to the invention, for the self-learning algorithm to directly predict one or more feed-quantity values after the last measurement instant, based on an input which comprises the measured feed-quantity values stored in the memory, in combination with values which are representative of associated measurement instants and optionally further time-dependent parameters. Such an algorithm may also be trained and lead to satisfactory prediction results. Therefore, in an alternative embodiment according to the invention, the self-learning algorithm may be configured to determine one or more feed-quantity values at the or each feeding place after the last measurement instant as output, based on the measured feed-quantity values stored in the memory as input. In this case, the control system may be configured to determine the starting time based on those one or more calculated feed-quantity values at the or each feeding place. Based on a plurality of feed-quantity values stored in the memory, the algorithm according to the invention can learn the course of the feed-quantity values over time and predict feed-quantity values after the last measurement instant. In other words, at the or each feeding place, the control system determines the quantity of feed after the last measurement instant. On the basis of the one or more calculated feed-quantity values, the control system then determines the starting time to start loading a subsequent batch of feed and/or to take an already loaded batch of feed. As a result thereof, it is also possible to ensure that the animals at the feeding places can virtually always eat, while simultaneously maintaining the quality of the feed at the feeding places at a high level by adding feed as late as possible.

The invention also relates to a method for automatically feeding animals, in particular cows, such as dairy cows or meat cows, by means of a feeding system as described above, the method comprising the following steps:

repeatedly measuring a feed-quantity value for the quantity of feed which is present for consumption by the animals at the or each feeding place, storing a plurality of feed-quantity values measured at the or each feeding place at different measurement instants in the memory of the control system, determining, in particular calculating, at least one value of a variable which is representative of a relation between the feed-quantity values and time, i.e. in particular is related to the course of or the decrease in the feed-quantity values over time, during at least one period at and/or after the last measurement instant, based on the feed-quantity values stored in the memory.

The method according to the invention has the same technical effects and advantages as described above with regard to the feeding system according to the invention.

The invention will now be explained in more detail by means of the attached figures, in which.

Figure 1:
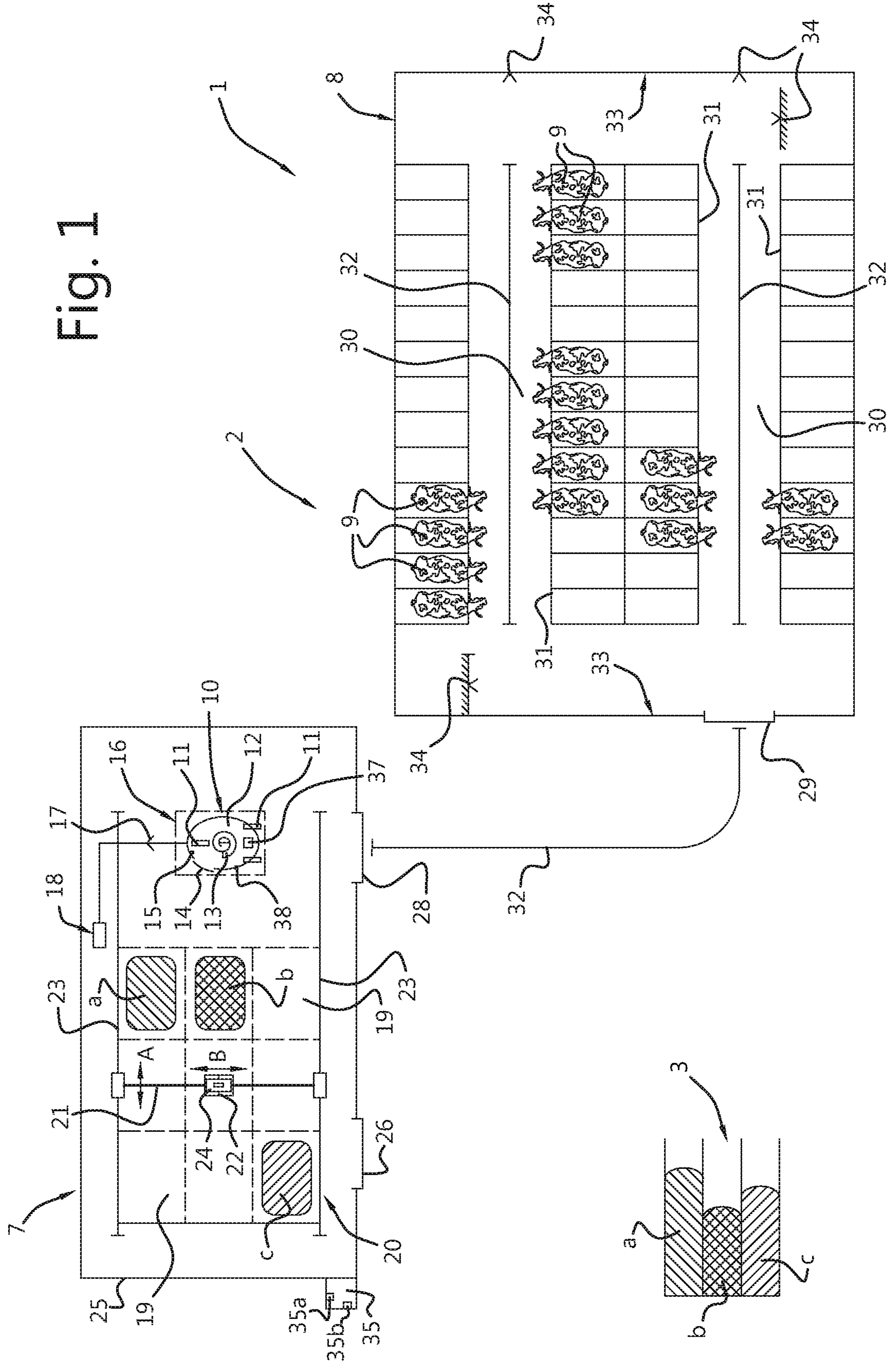
FIG. 1 shows a diagrammatic top view of a feeding system according to the invention.

The feeding system for feeding animals, in particular cows, such as dairy cows or meat cows, is denoted overall by reference numeral 1 in FIG. 1. The feeding system 1 is arranged in an operational area 2. The feeding system 1 comprises a feed storage 3 containing a plurality of feed types a, b, c, a feed supply 7 containing, in this exemplary embodiment, the same feed types a, b, c, an animal shed 8 containing the animals 9, and an autonomous feeding device 10 for feeding the animals 9 feed from the feed supply 7. Although the feed storage 3 shown diagrammatically in FIG. 1 comprises three adjacent silos containing feed types a, b, c, for example silage, the feed storage 3 may comprise further storage devices and/or types of feed, such as tower silos containing bulk feed, for example corn, potatoes and/or beets, or compressed bales. In the same way, the feed supply 7 may also contain more than the three feed types a, b, c shown in FIG. 1, such as concentrate. Obviously, the operational area 2 may optionally also contain a dwelling, one or more further animal sheds, sheds and other buildings (not shown).

In this exemplary embodiment, the autonomous vehicle 10 for feeding the animals 9 is configured as a self-propelled feed wagon. Obviously, it is possible, according to the invention, for the feeding system 1 to comprise more than one autonomous feed wagon 10, in particular two autonomous feed wagons 10 (not shown). By means of wheels 11, the feed wagon 10 is movable across a floor, farmyard or other ground surface. The feed wagon 10 comprises a container 12 for accommodating a batch of feed. In this exemplary embodiment, a mixing device 13 for cutting and/or mixing feed is provided in the container 12. A dispensing device 14 is provided in order to dispense and/or dose the feed from the container 12. The dispensing device 14 comprises, for example, a door which is displaceable between a closed and an open position.

The feed wagon 10 is autonomously displaceable by means of a driving and steering system for driving and steering the feed wagon 10 (not shown). The driving and steering system of the feed wagon 10 is controllable by means of a control unit 15 of the feed wagon 10. In this exemplary embodiment, the driving and steering system comprises an electrical drive motor (not shown) for each rear wheel 11. The electrical drive motors of the rear wheels 11 are controllable independently from one another. By controlling the rotary speed of the rear wheels 11, the feed wagon 10 can travel forwards or backwards in a straight line or make a bend.

The driving and steering system comprises a battery system for storing electrical energy (not shown). The battery system is connected to the electrical drive motors. In FIG. 1, the feed wagon 10 is situated at a feed loading station 16, at which the container 12 of the feed wagon 10 is filled with feed. The feed loading station 16 comprises a charging point 17 of a charging system 18 for charging the battery system of the feed wagon 10. The feed loading station 16 therefore also acts as a charging station. The control unit 15 of the feed wagon 10 is configured to control the mixing device 13 in such a way that the mixing device 13 mixes the feed contained in the container 12 while the feed wagon 10 is connected to the charging point 17 and the battery system of the feed wagon 10 is charged by means of the charging system 18.

In this exemplary embodiment, the feed supply system 7 forms a feed kitchen, i.e. an intermediate feed storage. The feed kitchen comprises a number of feed storage areas 19 to accommodate the feed types a, b, c and optionally further feed types (not shown). The feed storage areas 19 are separated from each other—the feed storage areas 19 are, for example, formed by delineated spaces on a floor, on which a silage block or a pressed bale is situated. Also, one or more of the feed storage areas 19 may comprise a trough for accommodating bulk feed, such as maize, potatoes or beets. The capacity of the feed kitchen is, for example, limited to a number of days. The quantities of feed of the feed types a, b, c which can be accommodated in the feed kitchen 7 are smaller than the quantities of feed of these feed types a, b, c which are stored in the feed storage 3.

A feed-loading device 20 is provided for transferring feed from the feed kitchen 7 to the container 12 of the feed wagon 10 if the feed wagon 10 is positioned at the feed loading station. In this exemplary embodiment, the feed-loading device 20 comprises a movable carrying rail 21 which is displaceably (see arrow A) arranged on two fixed carrying rails 23 which are arranged mutually parallel to and spaced apart from each other. The movable carrying rail 21 comprises a trolley 22 which is displaceable along the former (see arrow B). The trolley 22 is provided with a vertically displaceable feed grab 24 to grab feed from the feed storage areas 19. The feed grab 24 suspended from the trolley 22 can be displaced in a substantially horizontal plane so as to be situated above each of the feed storage areas 19.

The feeding system 1 according to the invention comprises a control system 35 with a memory 35*a*. Although the control system 35 in FIG. 1 is shown diagrammatically on the left-hand side, the control system 35 could also be arranged in a different location. The memory 35*a* may comprise a storage facility on a computer of the farm, a server at the manufacturer of the feeding system 1 which is connected to the control system 35 via the internet, and/or a cloud storage and/or something else.

The feed grab 24 is controlled by the control system 35. Ration data are stored in the memory 35*a*. The ration data comprise, for example, a plurality of rations for different groups of animals 9. Based on the ration data of a selected ration, i.e. mixed feed of feed types in a desired ratio (kg), the feed grab 24 takes quantities of the feed types a, b, c from the feed storage areas 19 to the container 12 of the feed wagon 10, while the feed wagon 10 is situated at the feed loading station 16, in such a way that the selected ration is accommodated in the container 10. By transferring a plurality of feed types to the container 12 of the feed wagon 10, a batch of mixed feed of feed types is produced therein according to the selected ration and in a desired quantity which depends on the feed requirement, i.e. a batch of mixed feed (kg) of feed types in a desired ratio.

In other words, in order to compose the batch of feed, the feed grab 24 in each case takes a quantity of feed from one of the feed storage areas 19, the feed grab 24 displaces that feed across the feed storage areas 19 until it is above the container 12 of the feed wagon 10 and then drops that feed into the container 12. The feed wagon 10 comprises a weighing device 37 which is configured to measure the weight (kg) of the feed which is accommodated in the container 12. The weighing device 37 is connected to the control system 35. When loading a batch of feed into the container 12 of the feed wagon 10, the control system 35 monitors how much feed (kg) of each feed type a, b, c is loaded into the container 12.

Obviously, the feed supply 7 and the feed-loading system 20 may also be configured differently. The feed grab 24 may, for example, also be incorporated in the feed wagon 10. In that case, the feed grab of the feed wagon 10 loads the container 12 with the desired quantity of feed of the desired composition, in particular directly from the feed storage 3. Furthermore, instead of or in addition to the feed storage areas 19 shown in FIG. 1, the feed system 1 may comprise one or more other feed supply devices, such as a driven conveyor belt for holding pressed bales or blocks cut from a silo in combination with a releasing device for releasing feed from such a bale or block, for example a cutter or blade, in particular a so-called "bale shredder", and/or a trough for bulk feed comprising an auger for the metered discharge of the feed, such as a so-called "commodity box", and/or a tower silo and/or something else. In this case, the feed-loading device may be provided with one or more driven conveyor belts for displacing the feed from the or each feed supply device to the container 12 of the feed wagon 10.

In addition, it is possible for the feed not to be mixed and/or cut in the container 12 of the feed wagon 10, but in a stationary mixer which is arranged near the feed supply 7 (not shown). In that case, the feed grab 24 and/or other feed supply device loads a batch of feed from the feed supply system 7 into the stationary mixer. Following mixing and/or cutting by means of the stationary mixer, the mixed feed is loaded into the feed wagon 10. Thus, the container 12 of the feed wagon 10 does not have to contain a mixing device. In this case, it is possible for the stationary mixer in each case to receive a quantity of feed which corresponds to a single batch of feed for the container 12 of the feed wagon 10. However, the stationary mixer may also have capacity to accommodate and prepare a plurality of batches of feed for the container 12 of the feed wagon 10. The quantity of feed in the stationary mixer then forms a premixed quantity of feed which is supplied to the container 12 of the feed wagon 10 in portions, i.e. for a plurality of feeding rounds.

The feed kitchen 7 is surrounded by a safety fence 25. An access door 26 is provided in the safety fence 25, so that, for example, a fork-lift truck or tractor can enter the feed kitchen 7 via the access door 26 in order to replenish the feed storage areas 19 with the different feed types a, b, c from the feed storage 3. In addition, the safety fence 25 comprises a passage door 28 for the feed wagon 10. The feed wagon 10 can enter and exit the feed kitchen 7 via the passage door 28. Obviously, it is possible that the safety fence 25 only comprises one door, via which both the feed wagon 10 and the tractor or fork-lift truck can enter and exit the feed kitchen 7. Also, the safety fence 25 in FIG. 1 may extend to the left of the feed loading station 16 and the passage door 26, in which case the safety fence 25 protects the feed kitchen 7 containing the feed storage areas 19, but the feed loading station 16 is freely accessible via the passage door 26 (not shown).

In addition to the safety fence 25, the feeding system 1 may comprise further safety features, for example an emergency stop by means of which the feed wagon 10 and/or the feed-loading system 20 is stopped immediately. In this case, for example, an alarm may sound and/or a message may be sent to a user, such as an e-mail or text message to a smartphone.

The animal shed 8 comprises a door opening 29, via which the feed wagon 10 can enter and exit the animal shed 8. The door opening 29 is closable by means of a shed door which is preferably openable automatically. In this exemplary embodiment, the animal shed 8 has two feeding alleys 30. Obviously, more or fewer feeding alleys may be provided. In this exemplary embodiment, each feeding alley 30 is delimited on either side by a feed fence 31. In other words, the animal shed 8 comprises four feed fences 31. The feed fences 31 each form a feeding place for feeding the animals 9. The animals 9 may be situated next to each other along the feed fence 31. The animals 9 are positioned with their head turned towards the feeding alley 30 and are able to put their head through the feed fence 31 in order to eat feed which has been deposited along the feed fence 31 by the feed wagon 10.

The feed fences 31 in the animal shed 8 are situated at a distance from the feed loading station 16 of the feed kitchen 7. Each of the feed fences 31 is reachable by the feed wagon 10 from the feed loading station 16. Various beacons are arranged in the operational area 2. In this exemplary embodiment, the beacons are formed by strips 32 which are disposed in or on a floor or another ground surface, walls 33 of the animal shed 8 and impact points 34. The feed wagon 10 comprises a sensor system (not shown) which is configured to cooperate with the beacons 32, 33, 34. In addition, the feed wagon 10 comprises a gyroscope (not shown) in order to travel straight ahead over a predetermined distance. The gyroscope is connected to the control unit 15 of the feed wagon 10.

In addition to the ration data, the memory 35*a* of the control system 35 contains various other data, such as navigation data and operating data. The navigation data comprise beacon data from the beacons 32, 33, 34. On the basis of the navigation data, the feed wagon 10 can travel different routes from the feed loading station 16 to and through the animal shed 8. The operating data comprises, for example, operating data for operating the dispensing device 14 of the feed wagon 10.

According to the invention, the feed wagon 10 comprises a feed-quantity measuring device 38 for measuring a feed-quantity value for the quantity of feed for consumption by the animals 9 which is situated along the feed fence 31 which the feed wagon 10 passes. The feed-quantity measuring device 38 comprises, for example, a laser which measures the feed height (h in mm) of the feed along the feed fence 31. The quantity of feed at the feed fence 31 can be calculated on the basis of the measured feed height h. In this exemplary embodiment, the feed-quantity measuring device 38 is fitted to the feed wagon 10. The feed-quantity measuring device 38 measures the feed-quantity value h while the feed wagon 10 drives past the feed fence 31. Every time the feed wagon 10 drives past the feed fences 31, the feed-quantity measuring device 38 measures the associated feed-quantity values h.

In this exemplary embodiment, the feed wagon 10 comprises a feed-pushing device for pushing or piling up feed in a direction at right angles to the direction of travel of the feed wagon 10 (not shown), i.e. the feed-pushing device pushes feed which is situated along the feed fence 31 and which the animals 9 moved away from the feed fence 31 during eating, back towards that feed fence 31. In this case, the feed-pushing device also displaces the dispensed fresh feed. In other words, after the dispensing device 14 has dispensed the fresh feed, that fresh feed is immediately piled up, together with the feed which was still situated along the feed fence 31. The feed-quantity measuring device 38 is fitted to the feed wagon 10 in such a way that the feed which has just been deposited by the dispensing device 14 is included when measuring the quantity of feed, i.e. the dispensing device 14 first doses out the feed from the container 12 in front of the feed fence 31 and immediately thereafter the feed-quantity measuring device 38 measures the feed-quantity value at that feed fence 31. This measured feed-quantity value depends on the quantity of feed which had not yet been eaten, i.e. was dispensed earlier and was pushed back to the feed fence 31, and on the quantity of fresh feed which was dosed out at that feed fence 31.

The control system 35 is configured to receive the feed-quantity values measured along the feed fences 31. The feed-quantity values are first temporarily stored in a memory of the control unit 15 of the feed wagon 10. After the feed wagon 10 has returned to the feed loading station 16, the measured feed-quantity values are sent to the control system 35 and stored in the memory 35*a* of the control system 35.

Figures 2A, 2B:
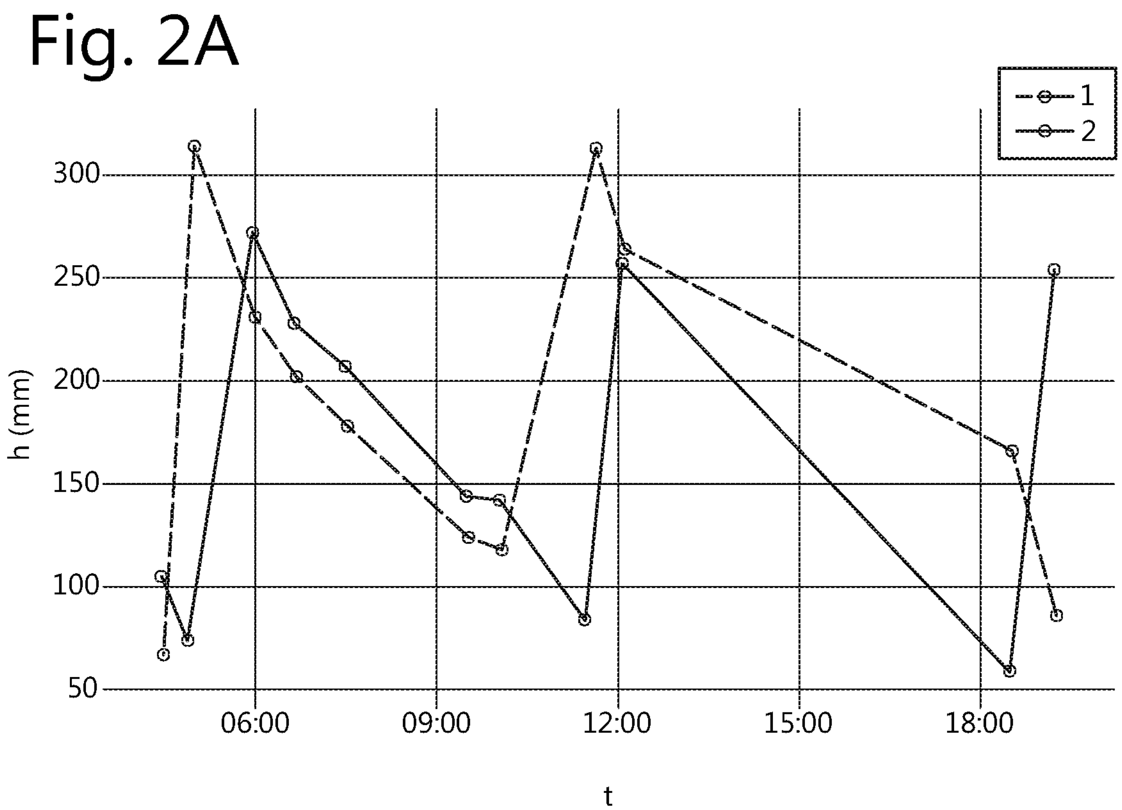
FIGS. 2A, 2B show graphs of measured feed-quantity values during a day and a plurality of days, respectively.

FIGS. 2A, 2B show graphs of actually measured feed-quantity values, which are stored in the memory 35*a*, for two feed fences 31 during a day and a plurality of days, respectively. As illustrated in the graphs, the feed-quantity value at each feed fence 31 in each case decreases over time until feed from a subsequent batch of feed is dosed out at that feed fence 31. The rate at which the feed-quantity value decreases, i.e. the rate of consumption, is different for each feed fence 31. This depends, for example, on the number of animals 9 along the feed fence 31 and the lactation stage of those animals 9, such as high-yield dairy cows, low-yield dairy cows, dry dairy cows, etc. Despite the irregular course of the feed-quantity values over time, the control system 35 according to the invention is able to accurately predict the relation between the feed-quantity values and time during a period after the last measurement instant. To this end, the control system 35 determines one or more values of a variable which represents the course of the feed-quantity values over time. This can be done in various ways.

A first embodiment of predicting one or more values of a variable which characterizes the relation between the feed-quantity values and time, will be explained by means of FIGS. 3A to 3D.

Figure 3A:
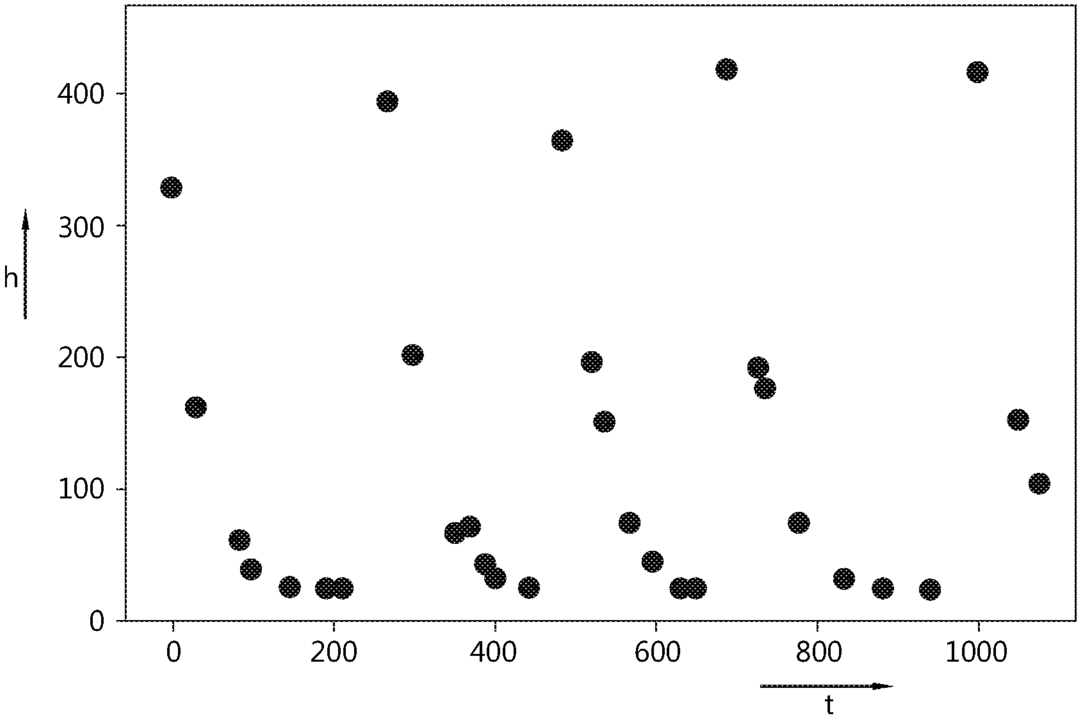
FIGS. 3A, 3B, 3C, 3D show graphs of measured feed-quantity values and calculated functions for the relation between the feed-quantity values and time.

FIG. 3A, by way of example, shows a graph of measured feed-quantity values over time t during a number of successive feeding rounds. As described above, the feed-quantity measuring device 38 of the feed wagon 10 measures the absolute feed height h (in mm) of a strip of feed which is piled up along the feed fence 31. This absolute feed height h forms a feed-quantity value, i.e. is a measure for the quantity of feed at that feed fence 31, and is plotted out along they axis in FIG. 3A.

Every feeding round runs from the moment at which feed from a batch of feed is dosed out until the moment when the feed has finished. In other words, every feeding round starts with a feed-quantity value which is measured immediately after the feed has been dispensed, and ends with a feed-quantity value which is measured immediately before feed from a subsequent batch is dispensed. The memory 35*a* of the control system 35 stores when the feed wagon 10 drives to dispense feed, i.e. the control system 35 records if a feed-quantity value was measured immediately after feed was dispensed at the feed fence 31.

In the example illustrated in FIG. 3A, every feeding round comprises a plurality of measured feed-quantity values, i.e. during all of the different feeding rounds, a plurality of feed-quantity values is also measured and stored in the memory 35*a* of the control system 35. Obviously, more or fewer feed-quantity values may be collected and stored during each feeding round. The number of feed-quantity values which the control system 35 uses to predict the value of the variable which represents the relation between the feed-quantity values and time equals n, wherein n is for example between 5 and 500.

In this exemplary embodiment, the control system 35 assumes an exponential relation between the feed-quantity values and time. For the function h(t) for the feed-quantity values h as a function of the time t, the control system 35 assumes an exponential function, which comprises $e^{\lambda t}$, such as $N \cdot e^{\lambda t}$, wherein the parameter λ, which is smaller than 0, is a variable which is representative of the relation between the feed-quantity values and time, at least at and/or after the last measurement instant. The parameter λ is directly linked to the rate of consumption. N is a constant, such as 100. The control system 35 is configured to calculate a value for the parameter λ in the exponential function with $e^{\lambda t}$ by means of a function fit, in particular a "curve fit", based on a plurality of n feed-quantity values stored in the memory 35*a*.

For every last-measured feed-quantity value, the control system 35 in each case determines a function h(t) for the feed-quantity values h as a function of the time t, based on the plurality of n feed-quantity values of a feeding round or of a plurality of feeding rounds together. Therefore, the control system 35 is configured to repeatedly or continuously predict a function h(t) for the relation between the feed-quantity values and time by again determining the parameter λ for every last measurement, i.e. the control system 35 dynamically adapts the function h(t). The algorithm is therefore self-learning or machine-learning in the sense of "online learning", i.e. the control system 35 uses the data which are collected in the form of the measured feed-quantity values to learn and adaptively predict the function h(t).

Figure 3B:
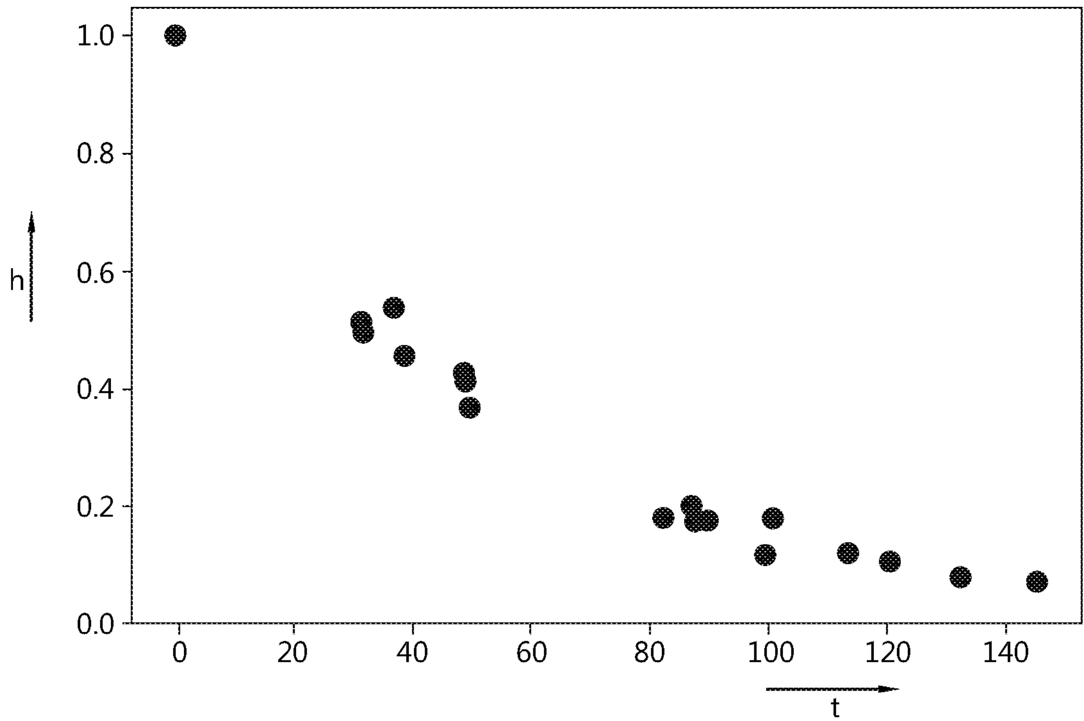

In order to determine the parameter λ, it is possible to use feed-quantity values of in each case only one feeding round. By contrast, the control system 35 can also combine the measured feed-quantity values of a plurality of feeding rounds. This is illustrated in FIG. 3B. In this case, the control system 35 may be configured to re-size the measured feed-quantity values in such a way that the maximum feed-quantity value has the same value each time. In other words, the value of the absolute feed height h which is measured immediately after the feed has been dosed out is in each case converted into a fixed value, in this exemplary embodiment 1 (see FIG. 3B). Although the absolute peak values (in mm) of the feed heights h of a plurality of feeding rounds will in practice virtually always differ with respect to each other, as can be seen in FIG. 3A, the relative peak values of the feed-quantity values are equal by definition. The feed-quantity values along the y axis of the graph in FIG. 3B, also denoted by h, thus form relative feed-quantity values. The control system 35 as it were superimposes the measured feed-quantity values of successive feeding rounds of the example shown in FIG. 3A onto each other. In this case, the time t is transformed to a time since the last feeding operation, in FIG. 3B also denoted by t, i.e. the time which has passed in each case from the dosing out of fresh feed from a batch of feed.

Figure 3C:
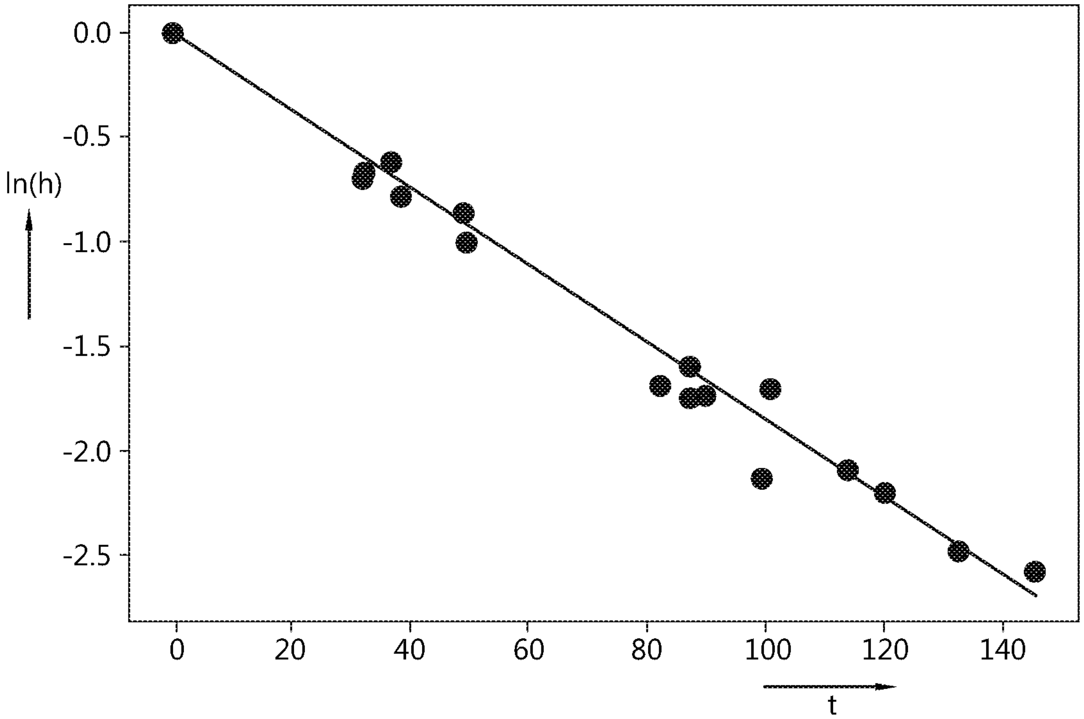

In order to then perform the function fit, the natural logarithm of the relative feed-quantity values h and the time t since the last feeding operation may, for example, be approximated by a straight line using linear regression. In FIG. 3C, the straight line calculated by means of linear regression is shown for the penultimate measured feed-quantity value. The slope of this straight line determines the parameter λ which characterizes the rate of consumption. In this way, the control system 35 determines a value for the parameter λ for every measured feed-quantity value, and thus a function h(t), which may in each case be slightly different. The control system 35 adds a function h(t) to each measured feed-quantity value and associated measurement instant, which function the control system 35 has determined based on this measured feed-quantity value and previous measured feed-quantity values. When a new feed-quantity value is measured, the control system 35 determines a new function h(t) again, which may differ from the previous function h(t). As a result thereof, the control system 35 uses the most recent available information and the control system 35 can accurately predict the decrease in the feed-quantity values over time.

Incidentally, when determining the function h(t) based on the value for the parameter λ calculated by linear regression, the graph along the x axis (horizontal) or along the y axis (vertical) may be transposed in such a way that the last-measured feed-quantity value falls on the graph. In this case, the function h(t) is updated dynamically by means of the calculated value for the parameter λ, and is further adjusted dynamically due to the shift of the graph in such a way that the last-measured feed-quantity value is on the graph. However, this second dynamic adjustment is optional—it is also possible to predict accurately based only on the calculated value for the parameter λ. Then, the course of the feed-quantity value over time is only determined from the peak value as it were.

When the control system 35 has determined the function h(t) for the relation between the feed-quantity values h and the time t on the basis of the measured and stored feed-quantity values, then the control system 35 can, on the basis of this function h(t), easily determine the future time $t_2$ when the absolute feed-quantity value h (in mm) drops below a residual quantity of feed $h_{res}$ by solving the equation $h(t)=h_{res}$, wherein the value for the parameter λ determined by the function fit is filled in in the function h(t), and the function h(t) is optionally also transposed horizontally or vertically in order to make the last-measured feed-quantity value h fall on the graph, and wherein $h_{res}$ is an effective empty value which corresponds to a residual quantity of feed. The control system 35 is configured to solve this equation for each of the feed fences 31.

The residual quantity of feed is the quantity of feed which the animals 9 have sorted out during eating and which is not, or hardly, eaten by the animals 9 anymore. In practice, there will virtually always be such a residual quantity of feed left at the feed fences 31. The feed-quantity value $h_{res}$ corresponds to this residual quantity of feed, and forms an effective zero value. If the feed-quantity value $h_{res}$ is reached at a feed fence 31, that feed fence 31 is effectively empty—the feed is "finished", even if there is still residual feed present. In this exemplary embodiment, the feed-quantity value $h_{res}$ is manually selected as an effective empty value and set in the control system 35, for example by the farmer or a service technician. The feed-quantity value $h_{res}$ is preferably adjustable for each feed fence 31 separately.

Figure 3D:
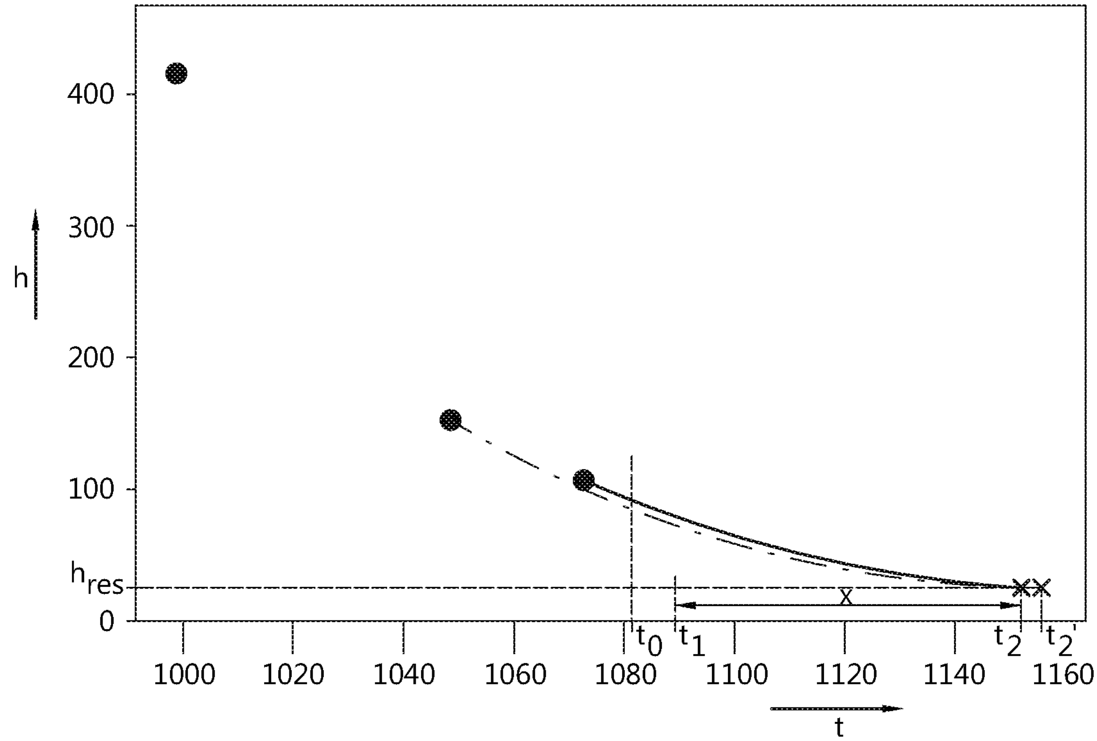

Therefore, the control system 35 is configured to calculate a value for the time t in the function h(t) by solving the equation $h(t)=h_{res}$. The calculated value for the time t indicates when the feed fence 31 will become empty, i.e. a future depletion time $t_2$ for that feed fence 31. In other words, by solving the equation for each feed fence 31, the control system 35 determines when the feed at that feed fence 31 effectively finishes. FIG. 3D shows the predicted depletion time $t_2$ and $t_2'$ for two successive measured feed-quantity values. As can be seen in FIG. 3D, the predicted depletion time $t_2'$ was slightly adapted on the basis of the last-measured feed-quantity value.

The rate of consumption for each feed fence 31 may vary during the day (24 hours). The rate of consumption depends on the day and night rhythm of the animals 9. In order to take into account the day rhythm and night rhythm of the animals 9, the number of feed-quantity values n, which the control system 35 uses for the prediction, may be chosen to be relatively small, such as n=5. The smaller n, the more dynamically the predictions will be adjusted. Optionally, the control system 35 may also be configured to determine the parameter λ on the basis of a time-dependent selection of the plurality of n feed-quantity values stored in the memory, which for example depends on the point in time on the day. Instead of all n last, measured feed-quantity values stored in the memory, the control system 35 then uses, for example, only the feed-quantity values which have been measured during a dynamically adjusted time window, such as during a given time period after the current time on the day. The selection is in particular adjusted to take the day and night rhythm of the animals into account.

Depending on the future depletion time $t_2$, or the time period until that depletion time, the control system 35 generates a feed-finished signal. The feed-finished signal is representative of when the feed at the or each feeding place finishes (point in time) or how much time remains until this is the case (time period). The control system 35 generates the feed-finished signal based on the calculated values for the future depletion time $t_2$ or the time period until that depletion time for each of the feed fences 31. On the basis of the feed-finished signal, the control system 35 can then control the feeding system in such a way that a subsequent batch of feed is delivered at the feed fences 31 at a more accurate time, i.e. not too early, so that the feed remains fresh, and not too late, so that the animals 9 are always able to eat.

In particular, the control system 35 determines a starting time $t_1$ to start loading a subsequent batch of feed into the container 12 of the feed wagon 10 by calculating back from the future depletion time $t_2$ by at least such a time interval x that the subsequent batch of feed is dispensed at the feed fence 31 by the feed wagon 10 before the animals 9 have substantially finished the feed at that feed fence 31 (see also FIG. 3D). In other words, the control system 35 sends a start command to the feed-loading system 20 at the starting time $t_1$ to start loading the subsequent batch of feed into the feed wagon 10, so that there is sufficient time to load and mix the subsequent batch of feed in the container 12 of the feed wagon 10, drive to the feed fence 31 and dose out the feed before the feed at that feed fence 31 effectively finishes. The current time is denoted by $t_0$ in FIG. 3D.

The time interval x may be chosen to be fixed for each feed fence 31 in the control system 35. The fixed time interval x is input, for example manually, into the control system 35 by a farmer or service technician, preferably based on experience of the time period which is required from the start command to the feed-loading system 20 to start loading the subsequent batch of feed to the actual dosing out of the feed at the feed fence 31 by the feed wagon 10. However, the fixed time interval x may also be calculated and adjusted automatically by the control system 35. The fixed time interval x is for example between 10 minutes and 3 hours. In practice, such a time interval x is usually sufficient to prepare the subsequent batch of feed and take it to the feed fence 31 and dispense it there.

However, it is preferable for the time interval x to be variable. The control system 35 determines the time interval x, for example in dependence on the selected ration, the quantity of feed (kg) of the subsequent batch which depends on the feed requirement, and the associated mixing time. The required time period for preparing the subsequent batch of feed depends on the selected ration. The control system 35 can request for each ration how long it takes to prepare the subsequent batch of feed according to that ration in the feed wagon 10. Obviously, the required time period also depends on the quantity of feed of the subsequent batch. Also, the required mixing time affects the loading time for loading and preparing the subsequent batch of feed.

In addition, the time which the feed wagon 10 requires to drive to the various feed fences 31 may vary. The feed fences 31 are situated at different distances from the feed kitchen 7, and different routes to a feed fence 31 may also be possible. The control system 35 may determine a delivery time or travel time for driving one or more routes to the different feed fences 31, and also make the time interval x dependent thereon.

After the control system 35 has given the start command to the feed-loading system 20 at the starting time $t_1$ to start loading the required quantity of feed for the subsequent batch according to the selected ration into the feed wagon 10, the feed wagon 10 is loaded with this subsequent batch of feed, the feed is mixed in the feed wagon 10 for the set mixing time and the feed wagon 10 then drives autonomously to the one or more feed fences 31 with a feed requirement in order to dose out the feed for the animals 9.

In practice, a farm virtually always has a plurality of feed fences 31. When the feed at one of the feed fences 31 finishes, the feed wagon 10 will automatically add feed at that feed fence 31. In this case, the feed wagon 10 may drive a route along a plurality of other feed fences 31, so that feed-quantity values are also measured at these other feed fences 31. Since the feeding system 1 according to the invention stores the measured feed-quantity values in the memory **35*a* and the control system 35 determines the starting time $t_1$ to start preparing the subsequent batch of feed on the basis of an accurately predicted depletion time $t_2$, it is hardly necessary if at all to make the feed wagon 10 drive just in order to collect feed-quantity values. If the feed wagon 10 only measures feed-quantity values when driving to deliver feed at a feed fence 31 which has a feed requirement, and in doing so drives a route along one or more of the feed fences 31 and then also collects feed-quantity values at these feed fences 31, the control system 35** has sufficient feed-quantity values to accurately determine the starting time $t_1$.

As has already been indicated above, according to the invention, the course of the feed-quantity values over time can also be predicted in other ways. A second embodiment of predicting one or more values of a variable which characterizes the relation between the feed-quantity values and time will be explained by means of FIG. 4. This second embodiment uses a different self-learning algorithm 35*b* and may result in very reliable predictions, but requires more computing power than the above-described first embodiment. If the control system 35 is relatively simple, it is not always possible to provide the required computing power.

In this case, feed-quantity values may be stored and retained for several months or longer in the memory 35*a* of the control system 35. As the feeding system 1 according to the invention is in operation, ever more feed-quantity values which have been measured at different measurement instants can be collected in the memory 35*a*. In the memory 35*a,* the control system 35 may be given access to large quantities of data regarding the course over time of the measured feed-quantity values at each of the various feed fences 31. It is even possible to combine measurement data of different farms in order to train such a self-learning algorithm 35*b*.

The control system 35 is programmed by means of the self-learning algorithm 35*b* which is configured to recognize correlations, i.e. statistical relations, between the feed-quantity values measured at different measurement instants and stored in the memory 35*a*. The self-learning algorithm 35*b* is then for example configured to receive examples of input and output for each feed fence 31. The input of each example comprises a feed-quantity value at a measurement instant, a value which is representative of that measurement instant, and further time-dependent parameters, such as time elapsed since the last feed deposit at that feed fence 31 and/or the quantity of feed (kg) which has been dispensed at that feed fence 31 during a previous period of a preset duration, for example the previous 5 hours or 10 hours. The output ("target") of each example comprises an associated value for the rate of consumption which the control system 35 can calculate based on the course of the feed-quantity values over time. This will be explained below in more detail. The self-learning algorithm 35*b* is trained by means of such examples.

In order to analyze the examples for each feed fence 31, the control system 35 may be configured to divide the feed-quantity values stored in the memory into groups over time, which each correspond to a feeding round. Each group starts with a feed-quantity value which is measured directly after feed has been dispensed, and ends with a feed-quantity value which is measured immediately before feed from a subsequent batch is dispensed. This is possible because the memory of the control system 35 stores the instances when the feed wagon 10 drives to dispense feed, i.e. the control system 35 records whether a feed-quantity value is measured immediately after feed has been dispensed at the feed fence 31.

Figure 4:
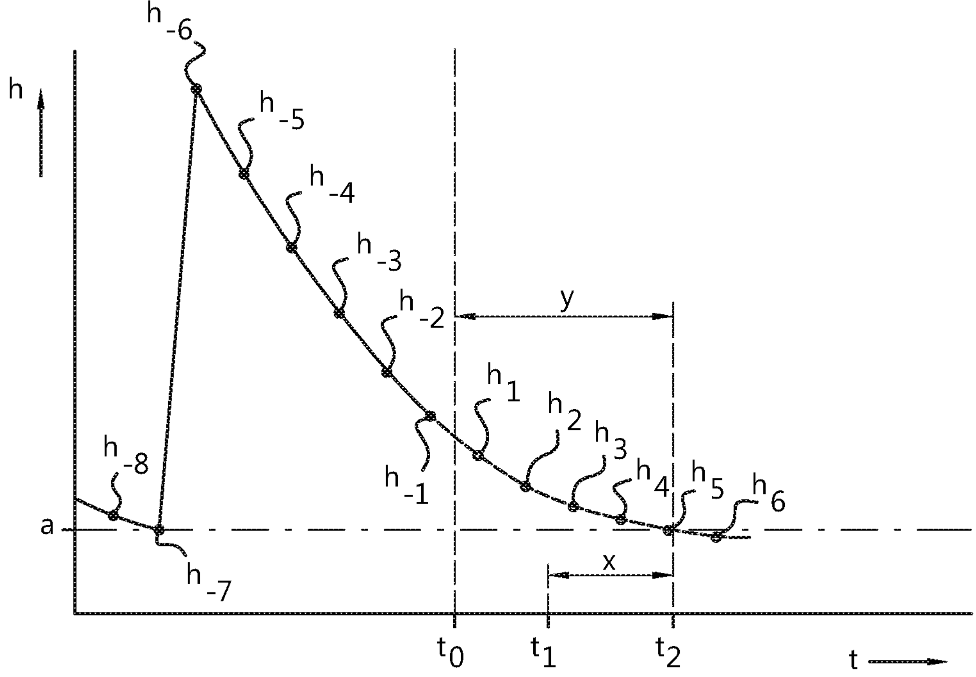
FIG. 4 shows a diagrammatic graph of measured and calculated feed-quantity values over time.

In this case, each group of feed-quantity values $h_{-n}$ is analyzed, as is illustrated in FIG. 4, which diagrammatically shows a course of the feed-quantity value over time at one of the feed fences 31. The feed-quantity values $h_{-1}$, $h_{-2}$, . . . , $h_{-n}$ measured at different measurement instants are illustrated by means of closed dots. The current time is denoted by $t_0$. The feed-quantity values $h_{-1}$, $h_{-2}$, . . . , $h_{-n}$, which are situated to the left of instant $t_0$ in FIG. 4, have been measured in the past and stored in the memory 35*a* of the control system 35. Based on these feed-quantity values $h_{-1}$, $h_{-2}$, . . . , $h_{-n}$, which may, in practice, comprise for example two months, i.e. many more than the eight feed-quantity values $h_{-1}$, $h_{-2}$, . . . , $h_{-8}$ shown in FIG. 4, the control system 35 according to this embodiment calculates the feed-quantity values $h_1$, $h_2$, . . . , $h_n$ after the last measurement instant, in this case in the future, using the self-learning algorithm 35*b*.

To this end, the control system 35 first calculates, for each group of feed-quantity values ($h_{-n}$), again by means of a function fit ("curve fit"), a value for a parameter λ in an exponential function, for example $N \cdot e^{\lambda t}$, wherein λ is representative of the rate of consumption, t is the time, and N is a constant, such as 100. This means that the feed-quantity values in each case assume an exponential course over time. In this case, each example with which the self-learning algorithm 35*b* is fed comprises a feed-quantity value $h_{-n}$ at a measurement instant, a value which is representative of that measurement instant, and further time-dependent parameters as input, and an associated value for the parameter λ as output ("target"), which value is calculated using a function fit.

The self-learning algorithm 35*b* is then able to recognize correlations, i.e. statistical relations, between the input and the output. Based on the recognized correlations, the algorithm can then predict a value for the parameter λ, which forms a measure for the rate of consumption at the feed fence 31 at and/or after the last measurement instant, as output. In other words, if the last-measured feed-quantity value $h_{-1}$ stored in the memory is presented as input to the algorithm in combination with an associated value which is representative of that last measurement instant and further time-dependent parameters, the self-learning algorithm 35*b* produces a value for the parameter λ as output. Thus, a function h(t) for the course of the feed-quantity values over time is fixed, which comprises the exponential function $N \cdot e^{\lambda t}$, which runs through the last-measured feed-quantity value $h_{-1}$ stored in the memory.

In this exemplary embodiment, the self-learning algorithm 35*b* therefore uses the last-measured feed-quantity value $h_{-1}$ stored in the memory 35*a* as a starting point for the prediction. This last-measured feed-quantity value $h_{-1}$ and the associated time-dependent parameters together form an input for the self-learning algorithm 35*b*. Based on this input, the self-learning algorithm 35*b,* after having been trained sufficiently by means of pattern recognition in the received examples, determines the value for the rate of consumption in the form of the parameter λ at the feed fence 31, at and/or after the last measurement instant, as output, i.e. a value which is representative of the rate at which the quantity of feed which is present at the feed fence 31 for consumption by the animals, decreases at that feed fence 31.

The control system 35 may be configured to then calculate the feed-quantity values $h_n$ at points in time after the last measurement instant by means of this function h(t), after which the control system 35 determines when the predicted feed-quantity value drops below the effective empty value (a in FIG. 4) which corresponds to the residual quantity of feed $h_{res}$. This determines when the feed will finish after the last measurement instant, i.e. the future depletion time $t_2$, or how much time remains until this is the case. In other words, by means of the calculated value for the rate of consumption, the control system 35 can calculate the feed-quantity values $h_1$, $h_2$, . . . , $h_n$ at points in time after the last measurement instant by means of the predicted value for the rate of consumption. These calculated feed-quantity values $h_1$, $h_2$, . . . , $h_n$ are indicated by open dots in FIG. 4. As a result thereof, the feeding system 1 takes into account variations in the rate of consumption, so that the feeding system 1 can deliver the subsequent batch of feed at the feed fence 31 (virtually) exactly at a desired time.

In this exemplary embodiment with the self-learning algorithm 35*b*, the control system 35 also assumes that the quantity of feed at the feed fence 31 exponentially decreases to an asymptotic value 0. The control system 35 determines when the predicted, future feed-quantity value at the feed fence 31 drops below the effective empty value which corresponds to the residual quantity of feed, i.e. the feed-quantity value $h_{res}$. At the point in time that the future feed-quantity value drops below the effective empty value $h_{res}$, the feed fence 31 is effectively empty, i.e. the feed has finished, even if there is still a small quantity of residual feed present. That future depletion time for the feed fence 31 is denoted by $t_2$ in FIG. 4.

Instead of or in addition to predicting the future depletion time $t_2$, i.e. the moment at which the feed at the feed fence 31 is effectively finished, the control system 35 may predict a depletion time duration y for the feed fence 31 (see also FIG. 4). The depletion time duration y indicates how long it takes before the predicted, future feed-quantity value $h_n$ at the feed fence 31 drops below the preset effective empty value $h_{res}$ for the quantity of feed at that feed fence 31. The depletion time duration y may also be determined based on the feed-quantity values $h_{-n}$ stored in the memory 35*a*, in particular by means of the rate of consumption at the feed fence 31 determined using the function fit or the self-learning algorithm 35*b*. The control system 35 then calculates the starting time $t_1$ based on this depletion time duration y for the feed fence 31. To this end, the control system 35 may directly compare the depletion time duration y for the feed fence 31 with the time interval x for producing the subsequent batch of feed and delivering that feed. It is therefore not necessary to explicitly determine the future depletion time $t_2$ in the control system 35.

The invention is not limited to the exemplary embodiment illustrated in the figures. The person skilled in the art may make various modifications without departing from the scope of the invention. For example, the self-learning algorithm 35*b* may also be configured to directly predict the future feed-quantity values based on the measured feed-quantity values stored in the memory. In other words, in this case the self-learning algorithm is fed examples which each comprise a feed-quantity value measured at a measurement instant in combination with associated values of time-dependent parameters as input, and a feed-quantity value measured after that measurement instant as output. After sufficient examples have been presented to the self-learning algorithm, the self-learning algorithm is able to predict one or more future feed-quantity values as output, based on the last-measured feed-quantity value and associated time-dependent parameters. In addition, the control system may be configured to calculate a value of another variable, such as a variable which is representative of a time period until a subsequent start command to start loading a subsequent batch of feed is desired. In this case, such a time period may be added in each case to each measured feed-quantity value stored in the memory. In other words, the control system may first convert the measured feed-quantity values to an associated time period until the next start command. Subsequently, the control system may calculate, on the basis of the converted values of this time period, one or more values for this time period at the or each feeding place at one or more points in time after the last measurement instant. In this case, the control system therefore does not have to predict feed-quantity values, for example, but the control system can directly predict the time period until the next start command is desired. According to the invention, it is also possible for the control system to use the one or more calculated values of the variable in a way other than to set the point in time at which feed from the subsequent batch of feed is delivered at the one or more feeding places. In addition thereto or instead thereof, the control system may, for example, send a message to a smartphone depending on the calculated feed-quantity value(s).

The invention claimed is:

1. A feeding system for feeding animals comprising at least one feeding place with feed from a feed supply, wherein the feeding system comprises:
   - at least one autonomous feeding device comprising a container for accommodating a batch of feed from the feed supply, wherein the autonomous feeding device is configured to take feed held in the container to the feeding place and dispense it at the feeding place,
   - a feed-quantity measuring device for repeatedly measuring a feed-quantity value for a quantity of feed which is available for consumption by the animals at the feeding place, and
   - a control system configured to receive feed-quantity values from the feed-quantity measuring device measured at the feeding place at different measurement instants, wherein the control system is configured to
     - store a plurality of feed-quantity values received from the feed-quantity measuring device in a memory, and
     - determine at least one value of a variable ($\lambda$, $h_n$) which is representative of a relation between the feed-quantity values and time at least at, and/or after, a last measurement instant, based on the plurality of feed-quantity values stored in the memory.

2. The feeding system according to claim 1, wherein the control system is configured to generate a feed-finished signal based on the value of the variable ($\lambda$, $h_n$) determined by the control system, wherein the feed-finished signal is related to a future depletion time $t_2$ for the feeding place.

3. The feeding system according to claim 2, wherein the future depletion time $t_2$ corresponds to a point in time at which the feed-quantity value, according to the relation between the feed-quantity values and time represented by the value of the variable ($\lambda$, $h_n$) determined by the control system, becomes equal to or falls below an effective empty value which corresponds to a residual quantity of feed at the feeding place.

4. The feeding system according to claim 2, wherein the control system is configured to control the feeding system, based on the feed-finished signal, based on the future depletion time $t_2$, or a time period until the depletion time $t_2$, in such a way that a subsequent batch of feed is dispensed at the feeding place by the autonomous feeding device before the animals have substantially finished the feed at the feeding place.

5. The feeding system according to claim 1, wherein the variable ($\lambda$, $h_n$) is representative of a rate of consumption at and/or after the last measurement instant with which the quantity of feed which is available for consumption by the animals at the feeding place, decreases at the feeding place.

6. The feeding system according to claim 1, wherein determining the value of the variable ($\lambda$, $h_n$) comprises determining, for each last-measured feed-quantity value stored in the memory, in each case an associated function h(t) for the feed-quantity values h as a function of the time t by means of a function fit, based on the plurality of feed-quantity values stored in the memory.

7. The feeding system according to claim 6, wherein the function h(t) for the feed-quantity values h as the function of the time t comprises an exponential function, $a^{\lambda t}$, and wherein the parameter $\lambda$ is representative of the relation between the feed-quantity values and time, at least at and/or after the last measurement instant, is representative of the rate of consumption, and t is the time, and wherein the control system is configured to calculate a value for the parameter λ in the exponential function by means of the function fit, based on the plurality of feed-quantity values stored in the memory.

8. The feeding system according to claim 7, wherein the control system is configured to calculate a value for the time t in the function h(t) by solving an equation which equates the function h(t) for the feed-quantity values as a function of the time t to an effective empty value $h_{res}$ which corresponds to a residual quantity of feed ($h(t)=h_{res}$), wherein a calculated value for the time t is representative of a future depletion time $t_2$ for the feeding place.

9. The feeding system for feeding animals according to claim 7, wherein a base a of the exponential function, $a^{\lambda t}$, is a number e.

10. The feeding system according to claim 1, wherein the control system is configured to determine the value of the variable (λ, $h_n$) based on a time-dependent selection of the feed-quantity values stored in the memory, wherein the control system is configured to determine the selection depending on a point in time on a day.

11. The feeding system according to claim 1, wherein the feeding system is provided with a feed-loading system for loading feed from the feed supply into the container of the autonomous feeding device, and wherein the control system is configured to control the feed-loading system and/or the autonomous feeding device to load a subsequent batch of feed and/or to take a loaded subsequent batch of feed to the feeding place, based on the determined value of the variable (λ, $h_n$).

12. The feeding system according to claim 11, wherein the control system is configured to determine a starting time $t_1$ to start loading the subsequent batch of feed and/or taking the loaded subsequent batch of feed to the feeding place, based on the determined value of the variable (λ, $h_n$), wherein the control system is configured to send a start command to the feed-loading system at the starting time $t_1$ to start loading the subsequent batch of feed, or to the autonomous feeding device to start taking a loaded batch of feed to the feeding place.

13. The feeding system according to claim 1, wherein the feed-quantity measuring device is fitted to the autonomous feeding device, and wherein the feed-quantity measuring device is configured to measure the feed-quantity value at the feeding place when the autonomous feeding device moves past the feeding place.

14. The feeding system according to claim 13, wherein the container of the autonomous feeding device comprises a dispensing device for dispensing feed from the container, and wherein the autonomous feeding device comprises a feed-pushing device for pushing residual feed which is situated at the feeding place and a quantity of feed which was dispensed by the dispensing device in a direction at right angles to a direction of travel of the autonomous feeding device, and wherein the feed-quantity measuring device is fitted to the autonomous feeding device in such a way with respect to the dispensing device that the measured feed-quantity value relates to pushed feed, which comprises the residual feed and the quantity of feed which was just dispensed by the dispensing device.

15. The feeding system according to claim 1, wherein the value of the variable (λ, $h_n$) comprises the feed-quantity value for the quantity of feed which is available for consumption by the animals at the feeding place.

16. The feeding system according to claim 1, wherein the control system comprises a self-learning algorithm which is configured to receive the feed-quantity values stored in the memory, and wherein the control system is configured to calculate the value of the variable (λ, $h_n$) using the self-learning algorithm.

17. A method for automatically feeding animals by means of a feeding system according to claim 1, comprising:

repeatedly measuring the feed-quantity value for the quantity of feed which is present for consumption by the animals at the feeding place, storing the plurality of feed-quantity values measured at the feeding place at different measurement instants in the memory of the control system, and determining at least one value of the variable (λ, $h_n$) which is representative of the relation between the feed-quantity values and time at least at and/or after the last measurement instant, based on the plurality of feed-quantity values stored in the memory.

18. The feeding system for feeding animals according to claim 1, wherein the feeding animals are cows selected from a group consisting of dairy cows or meat cows.

19. The method for automatically feeding animals according to claim 17, wherein the feeding animals are cows.

20. A feeding system for feeding animals comprising at least one feeding place with feed from a feed supply, wherein the feeding system comprises:

at least one autonomous feeding device comprising a container for accommodating a batch of feed from the feed supply, wherein the autonomous feeding device is configured to take feed held in the container to the feeding place and dispense it at the feeding place, a feed-quantity measuring device for repeatedly measuring a feed-quantity value for a quantity of feed which is available for consumption by the animals at the feeding place, a feed-loading system for loading feed from the feed supply into the container of the autonomous feeding device, a control system configured to receive feed-quantity values from the feed-quantity measuring device measured at the feeding place at different measurement instants, wherein the control system is configured to store a plurality of feed-quantity values received from the feed-quantity measuring device in a memory, determine at least one value of a variable (λ, $h_n$) which is representative of a relation between the feed-quantity values and time at least at, and/or after, a last measurement instant, based on the plurality of feed-quantity values stored in the memory, control the feed-loading system and/or the autonomous feeding device to load a subsequent batch of feed and/or to take a loaded subsequent batch of feed to the feeding place, based on the determined value of the variable (λ, $h_n$), determine a starting time $t_1$ to start loading the subsequent batch of feed and/or taking the loaded subsequent batch of feed to the feeding place, based on the determined value of the variable (λ, $h_n$), determine the starting time $t_1$ by calculating back from a future depletion time $t_2$ for the feeding place by a time interval x, which depends on a required loading time for loading the subsequent batch of feed and/or a required delivery time for delivering feed held in the container to the feeding place by means of the autonomous feeding device, and send a start command to the feed-loading system at the starting time $t_1$ to start loading the subsequent batch of feed, or to the autonomous feeding device to start taking a loaded batch of feed to the feeding place.

* * * * *